US012679642B2

(12) United States Patent
Steffens et al.

(10) Patent No.: US 12,679,642 B2
(45) Date of Patent: Jul. 14, 2026

(54) REFUSE VEHICLE WITH A HOPPER FILL SENSOR

(71) Applicant: Oshkosh Corporation, Oshkosh, WI (US)

(72) Inventors: Greg Steffens, Oshkosh, WI (US); Aaron Fisher, Oshkosh, WI (US); Amanda Miller, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 447 days.

(21) Appl. No.: 18/342,343

(22) Filed: Jun. 27, 2023

(65) Prior Publication Data
US 2023/0415986 A1 Dec. 28, 2023

Related U.S. Application Data

(60) Provisional application No. 63/356,110, filed on Jun. 28, 2022.

(51) Int. Cl.
B65F 3/20 (2006.01)
B65F 3/14 (2006.01)
G05D 105/28 (2024.01)

(52) U.S. Cl.
CPC ........ B65F 3/201 (2013.01); B65F 2003/146 (2013.01); G05D 2105/29 (2024.01)

(58) Field of Classification Search
CPC ............... B65F 3/201; B65F 2003/146; G05D 2105/29
See application file for complete search history.

(56) References Cited

U.S. PATENT DOCUMENTS

| | | | | |
|---|---|---|---|---|
| 9,428,334 | B2 * | 8/2016 | Whitfield, Jr. .......... | B65F 3/041 |
| 2004/0002794 | A1 | 1/2004 | Pillar et al. | |
| 2005/0113996 | A1 | 5/2005 | Pillar et al. | |
| 2005/0234622 | A1 | 10/2005 | Pillar et al. | |
| 2008/0114513 | A1 | 5/2008 | Pillar et al. | |
| 2012/0282077 | A1 * | 11/2012 | Alberts ..................... | B65F 3/08 |
| | | | | 414/810 |
| 2015/0210313 | A1 | 7/2015 | Sears et al. | |

(Continued)

FOREIGN PATENT DOCUMENTS

RU          2638531 C2 *  12/2017   ........ B65F 2003/146

OTHER PUBLICATIONS

McNeilus Truck and Manufacturing, Inc.(2010). Operator's Manual: Zero Radius. Retrieved from https://bigtruckrental.com/wp-content/uploads/2019/01/Zero-Radius.pdf.

*Primary Examiner* — James Keenan
(74) *Attorney, Agent, or Firm* — Foley & Lardner LLP

(57) ABSTRACT
A refuse vehicle includes a chassis, a cab coupled to the chassis, a refuse compartment supported by the chassis and including a storage volume and a hopper volume, a lift assembly configured to selectively move relative to the refuse compartment, a hopper sensor coupled to a portion of the refuse compartment and configured to measure a refuse height within the hopper volume, and a packing assembly including a pack panel and a packing actuator. The packing actuator is configured to selectively move the pack panel between a retracted position and an extended position. The pack panel is configured to extend away from the retracted position in response to the hopper sensor sensing that the refuse height is greater than or equal to a refuse height threshold.

17 Claims, 25 Drawing Sheets

100

(56)        References Cited

U.S. PATENT DOCUMENTS

| | | | |
|---|---|---|---|
| 2020/0290237 A1 | 9/2020 | Steffens et al. | |
| 2020/0291846 A1 | 9/2020 | Steffens et al. | |
| 2021/0121340 A1 | 4/2021 | Malcolm et al. | |
| 2021/0276423 A1 | 9/2021 | Lombardo et al. | |
| 2021/0276847 A1 | 9/2021 | Neubauer et al. | |
| 2021/0276848 A1 | 9/2021 | Miller et al. | |
| 2021/0369515 A1 | 12/2021 | Malcolm et al. | |
| 2022/0000686 A1 | 1/2022 | Malcolm et al. | |
| 2022/0072736 A1 | 3/2022 | Steffens et al. | |
| 2022/0118854 A1 | 4/2022 | Davis et al. | |
| 2022/0135385 A1 | 5/2022 | Lombardo et al. | |
| 2022/0204332 A1 | 6/2022 | Miller et al. | |
| 2022/0211560 A1 | 7/2022 | Malcolm et al. | |
| 2022/0234873 A1 | 7/2022 | Miller et al. | |
| 2022/0410688 A1* | 12/2022 | Parker | B65F 3/02 |
| 2023/0150584 A1 | 5/2023 | Zeamer et al. | |
| 2023/0150763 A1 | 5/2023 | Haberlein et al. | |
| 2023/0191887 A1 | 6/2023 | Rausch et al. | |
| 2023/0192401 A1 | 6/2023 | Zeamer et al. | |
| 2023/0211705 A1 | 7/2023 | Zeamer et al. | |
| 2023/0219749 A1* | 7/2023 | Ham | B65F 3/0213 |
| | | | 342/28 |
| 2023/0278475 A1 | 9/2023 | Steffens et al. | |

* cited by examiner

REFUSE VEHICLE WITH A HOPPER FILL SENSOR

CROSS-REFERENCE TO RELATED PATENT APPLICATIONS

This application claims the benefit of and priority to U.S. Provisional Application No. 63/356,110, filed on Jun. 28, 2022, the entire disclosure of which is hereby incorporated by reference herein.

BACKGROUND

The present disclosure relates generally to vehicles. More specifically, the present disclosure relates to a refuse vehicle that travels from location to location to pick and transport refuse from refuse containers along a travel route.

SUMMARY

One embodiment relates to a refuse vehicle that includes a chassis, a cab coupled to the chassis, a refuse compartment supported by the chassis and having a storage volume and a hopper volume, a lift assembly configured to selectively move relative to the refuse compartment, a hopper sensor coupled to a portion of the refuse compartment and configured to measure a refuse height within the hopper volume, and a packing assembly including a pack panel and a packing actuator. The hopper volume is arranged between the cab and the storage volume. The packing actuator is configured to selectively move the pack panel between a retracted position and an extended position. The pack panel is configured to extend away from the retracted position in response to the hopper sensor sensing that the refuse height is greater than or equal to a refuse height threshold.

Another embodiment relates to a refuse vehicle that includes a chassis, a cab coupled to the chassis, a refuse compartment supported by the chassis and having a storage volume and a hopper volume, a lift assembly configured to selectively move relative to the refuse compartment, a hopper sensor coupled to a portion of the refuse compartment and configured to measure a refuse height within the hopper volume, and a packing assembly including a pack panel and a packing actuator. The hopper volume is arranged between the cab and the storage volume. The packing actuator is configured to selectively move the pack panel between a retracted position and an extended position. The refuse vehicle further includes a controller having a processor and at least one memory. The controller is in communication with the hopper sensor and the packing actuator and is configured to: monitor a status flag of the hopper sensor, in response to determining that the status flag is active, determine if the refuse height is greater than or equal to a refuse height threshold, and in response to determining that the refuse height is greater than or equal to the refuse height threshold, instruct the packing actuator to extend away from the retracted position.

Another embodiment relates to a method of operating a refuse vehicle. The method includes monitoring a refuse height within a hopper volume using a hopper sensor, determining a status flag for the hopper sensor, in response to determining that the status flag for the hopper sensor is active, instructing a packing actuator to perform a packing procedure when the hopper sensor senses that the refuse height is greater than or equal to a refuse height threshold, and in response to determining that the status flag for the hopper sensor is inactive, instructing the packing actuator to perform the packing procedure when a hopper load count is greater than or equal to a threshold load count.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In general, conventional refuse vehicles track when to initiate a packing procedure (e.g., extend a pack panel from a retracted position toward an extended position) based on a number of loads that have been dumped into the hopper (e.g., the number of times a refuse container has been emptied into the hopper). This strategy for packing the does not account for a height of the refuse pile in the hopper, which can vary depending on how full each refuse container is that is loaded into the hopper, and may result in refuse falling out of the hopper during packing or travel.

When attempting to maintain refuse within the hopper during the packing procedure, the height of the refuse pile in the hopper is more important than the weight of the refuse pile. According to an exemplary embodiment, a vehicle (e.g., a refuse vehicle) includes a hopper sensor configured to measure and monitor a height of a refuse pile in a hopper section or volume of the vehicle. The active monitoring of the height of the refuse pile enables the vehicle to initiate a packing procedure when the height of the refuse pile is at or within a predefined tolerance of a refuse height threshold. In this way, for example, the refuse within the hopper is packed prior to the refuse pile reaching a height where there is potential for refuse to fall out of the hopper during the packing procedure or during vehicle travel.

Overall Vehicle

Figure 1:
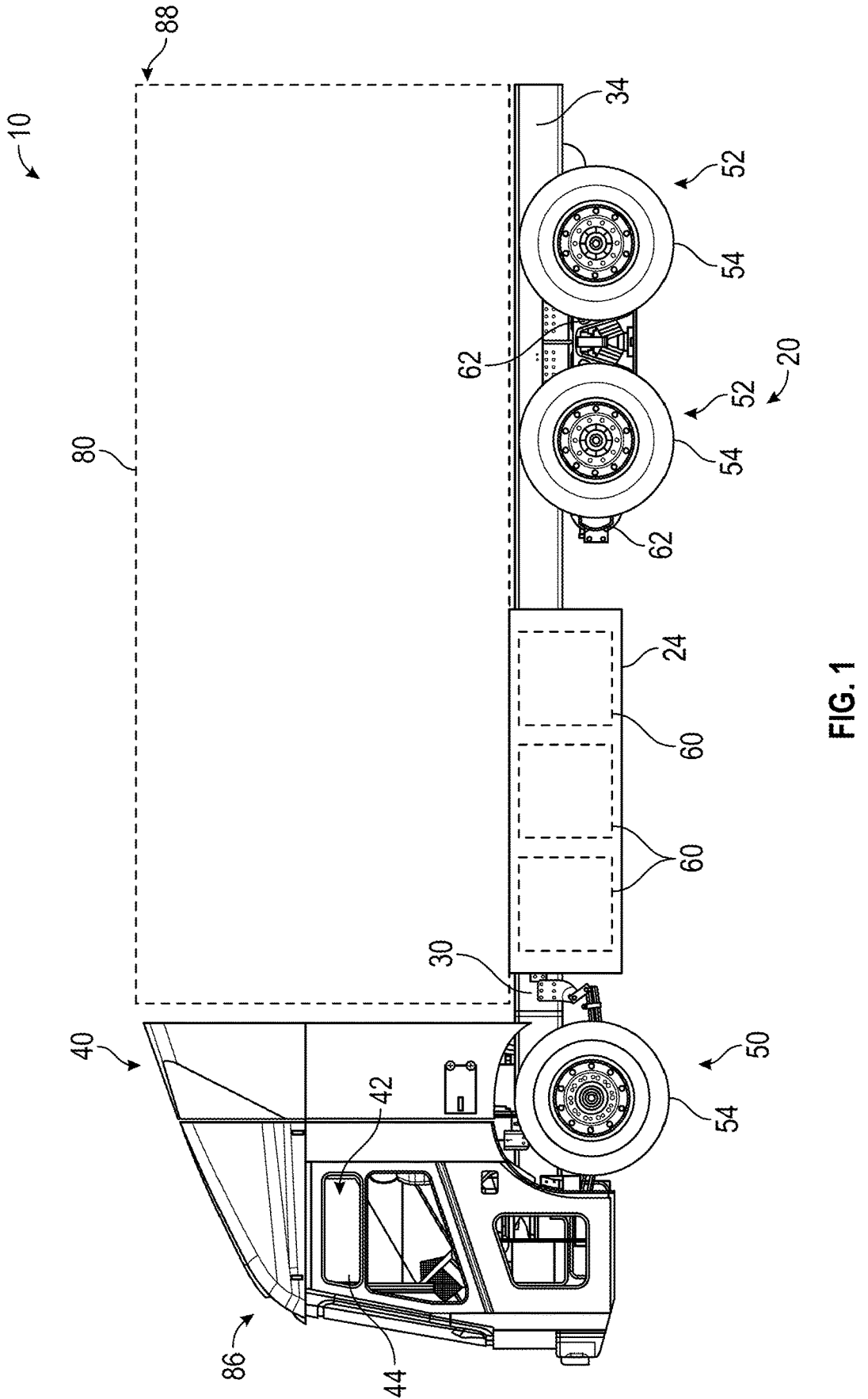
FIG. 1 is a left side view of a vehicle, according to an exemplary embodiment.
Figure 2:
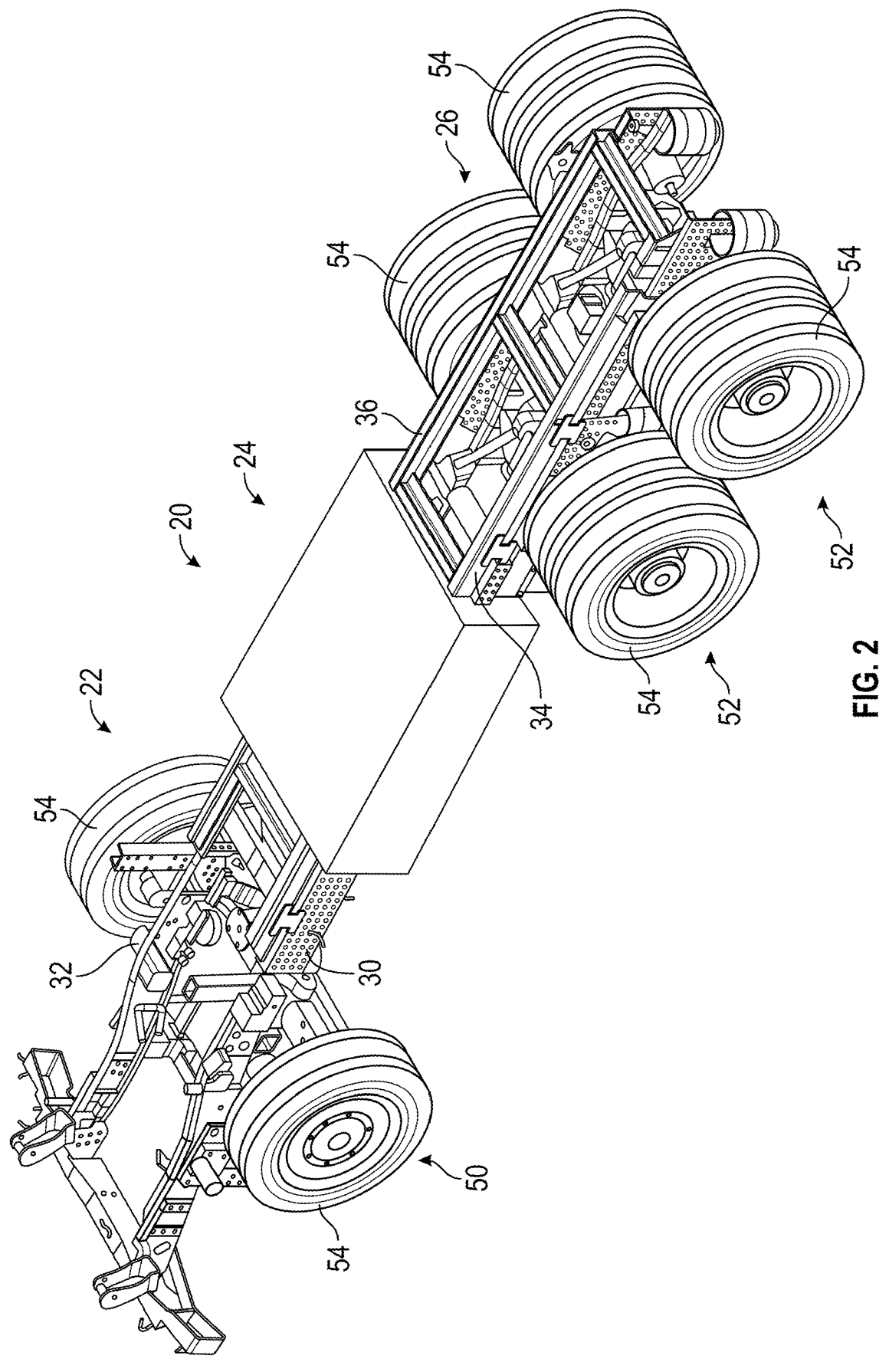
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
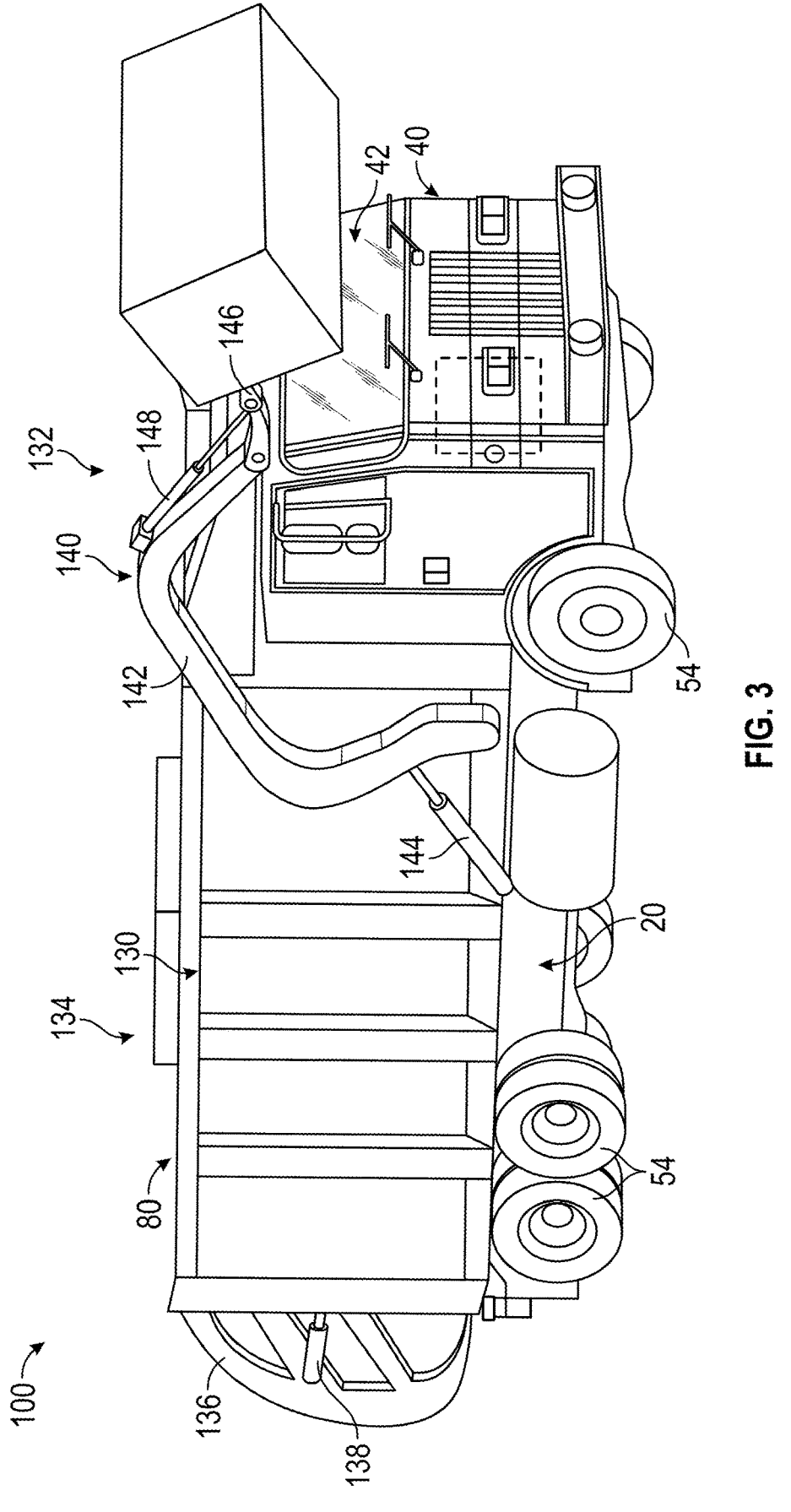
FIG. 3 is a perspective view of the vehicle of FIG. 1 configured as a front-loading refuse vehicle, according to an exemplary embodiment.
Figure 4:
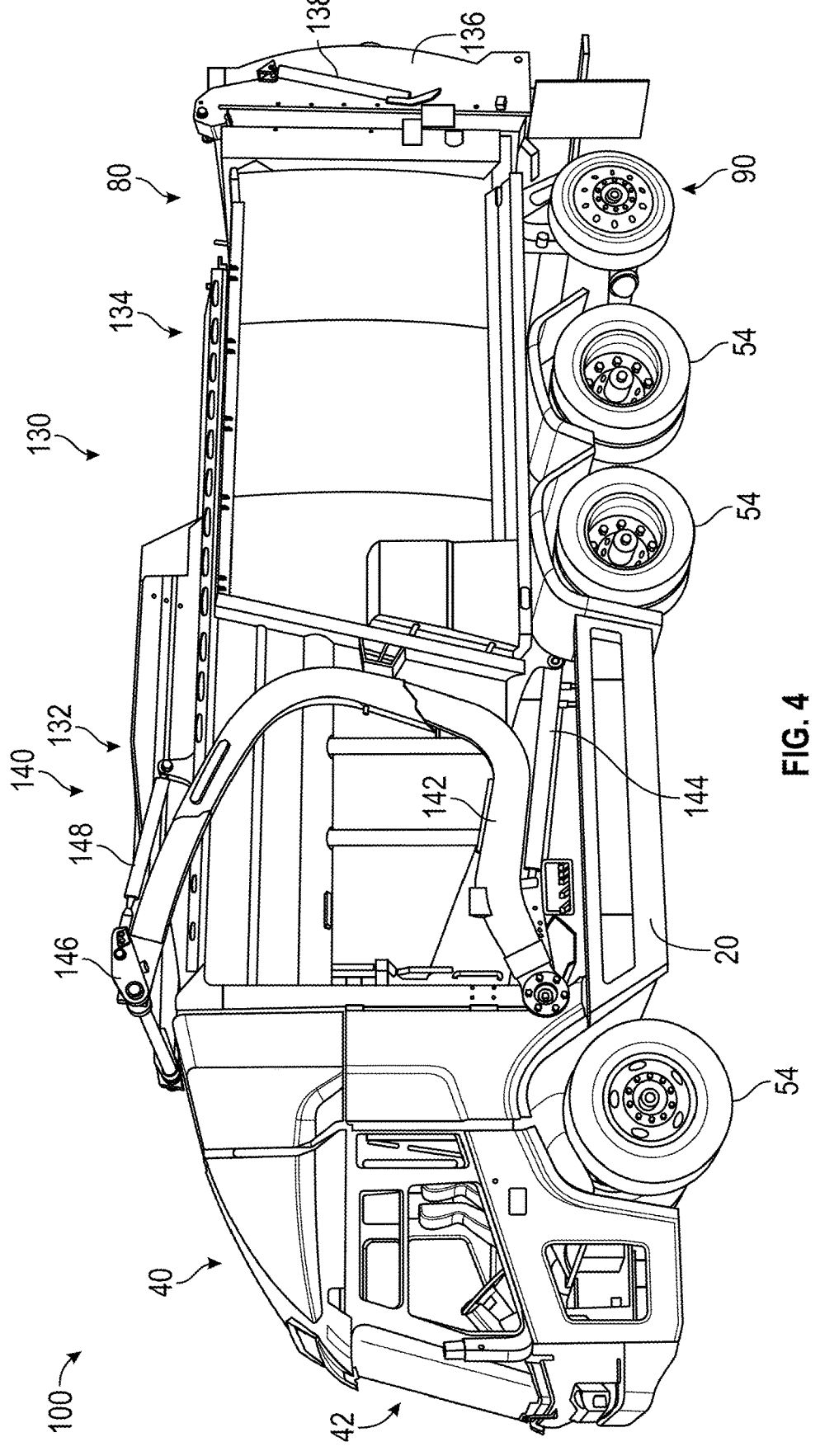
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
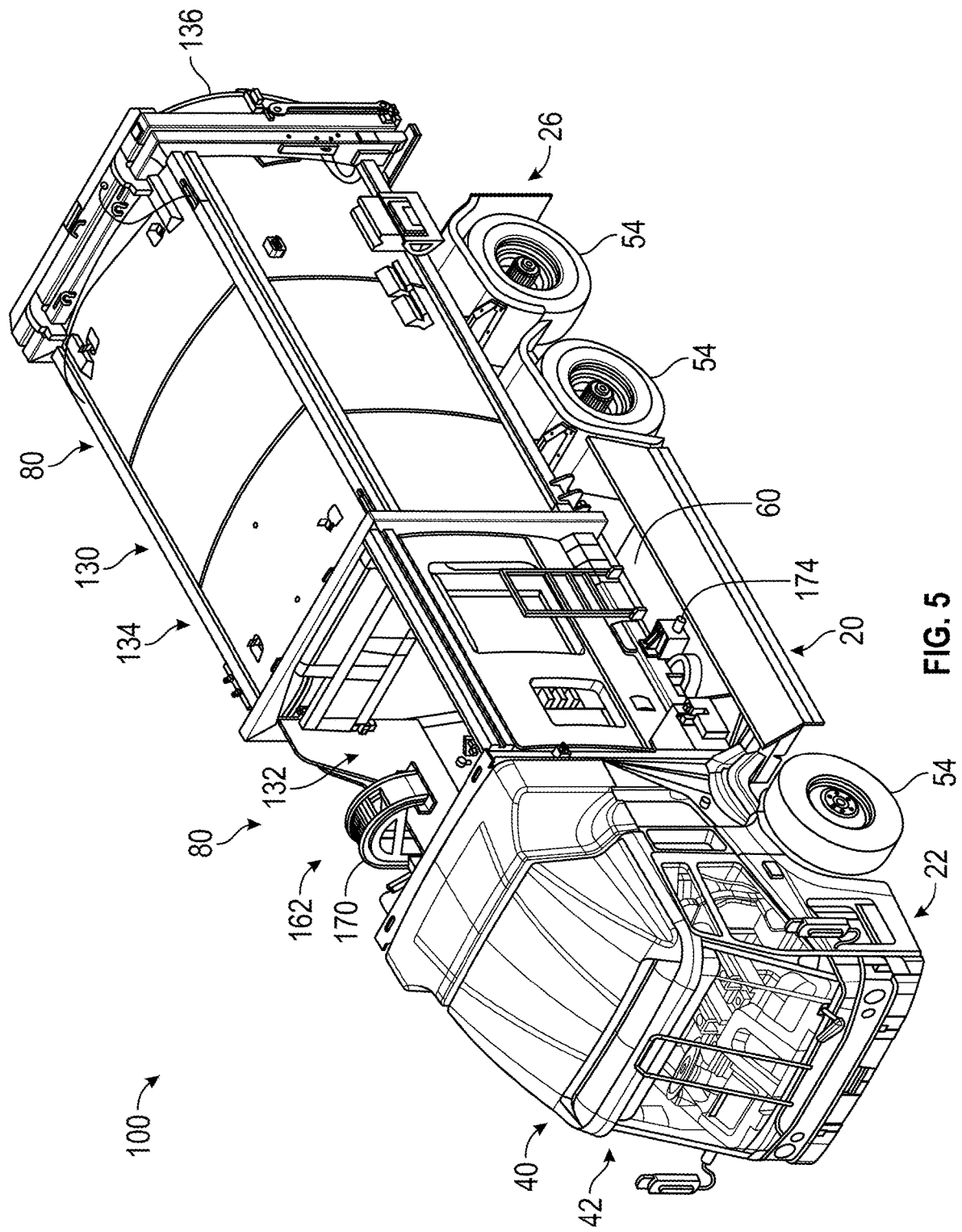
FIG. 5 is a perspective view of the vehicle of FIG. 1 configured as a side-loading refuse vehicle, according to an exemplary embodiment.
Figure 6:
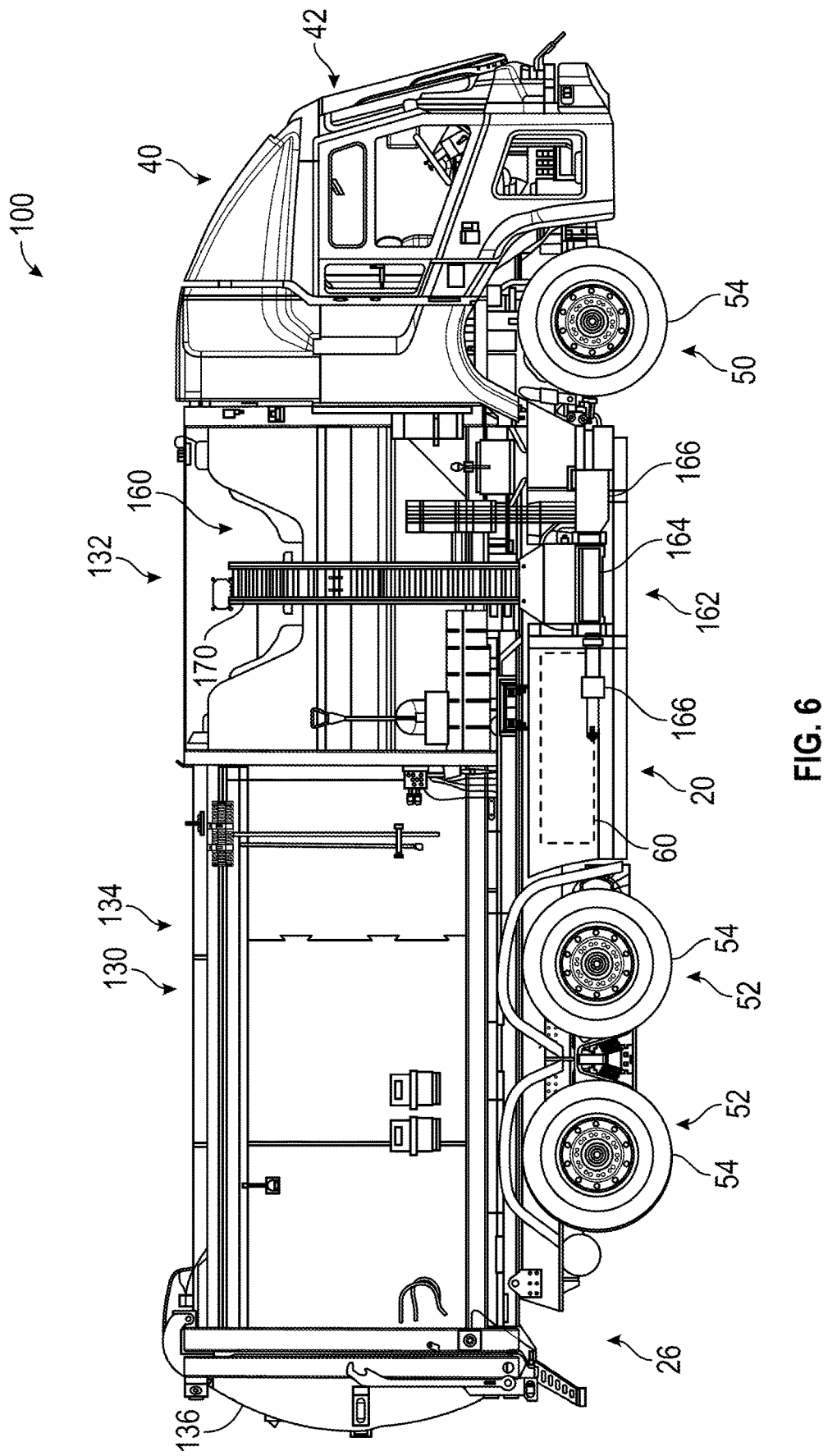
FIG. 6 is a right side view of the side-loading refuse vehicle of FIG. 5.
Figure 7:
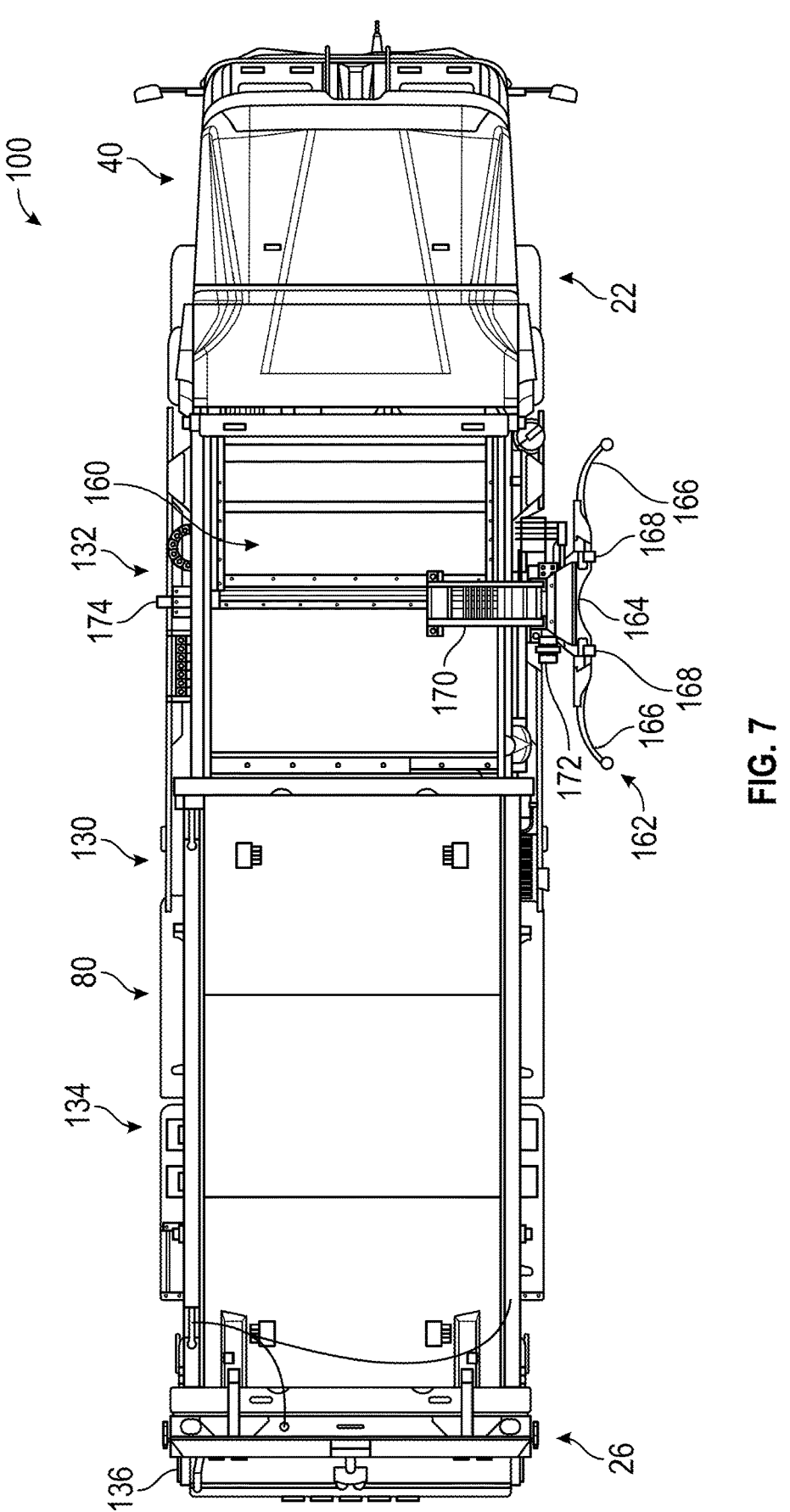
FIG. 7 is a top view of the side-loading refuse vehicle of FIG. 5.
Figure 8:
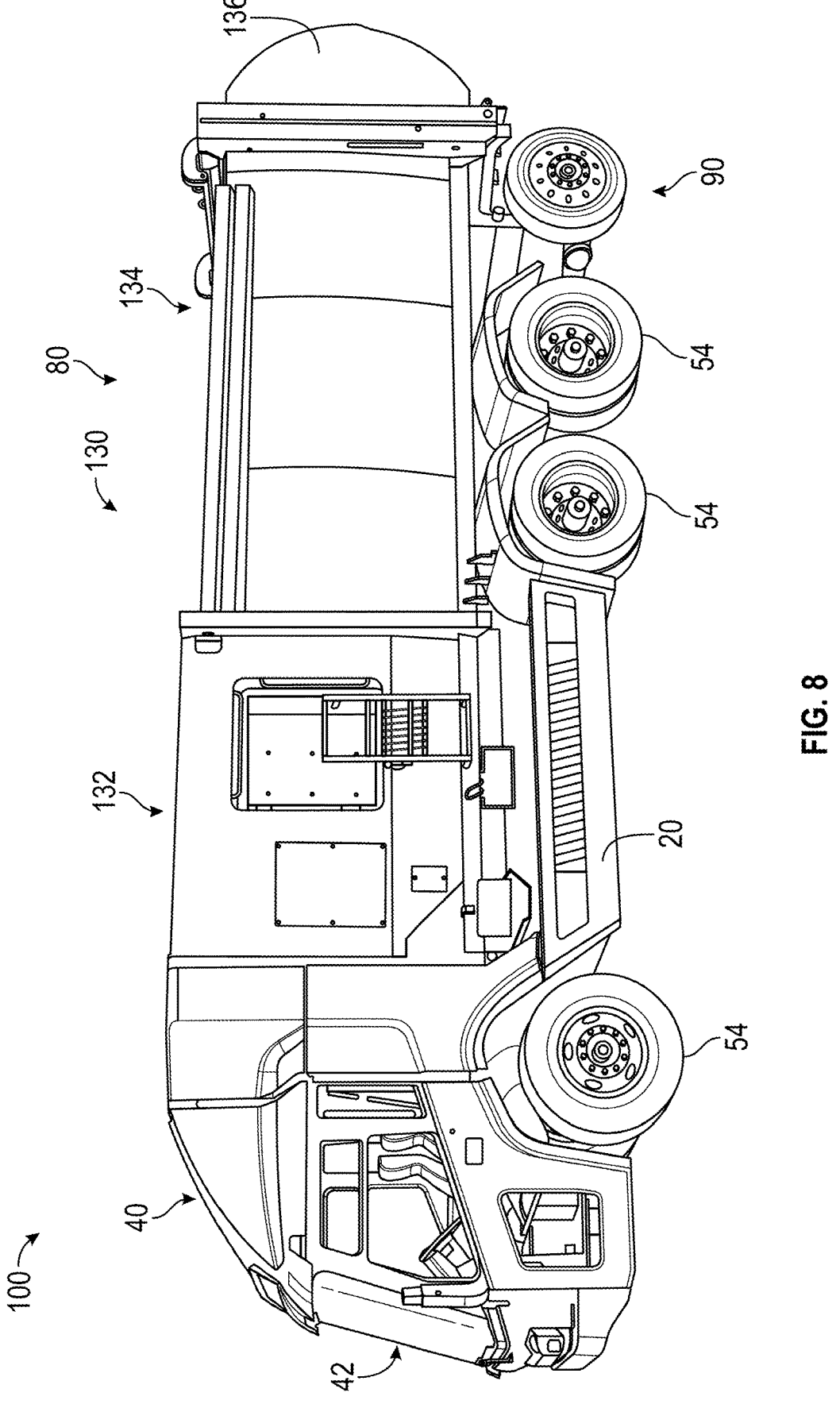
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170.

In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
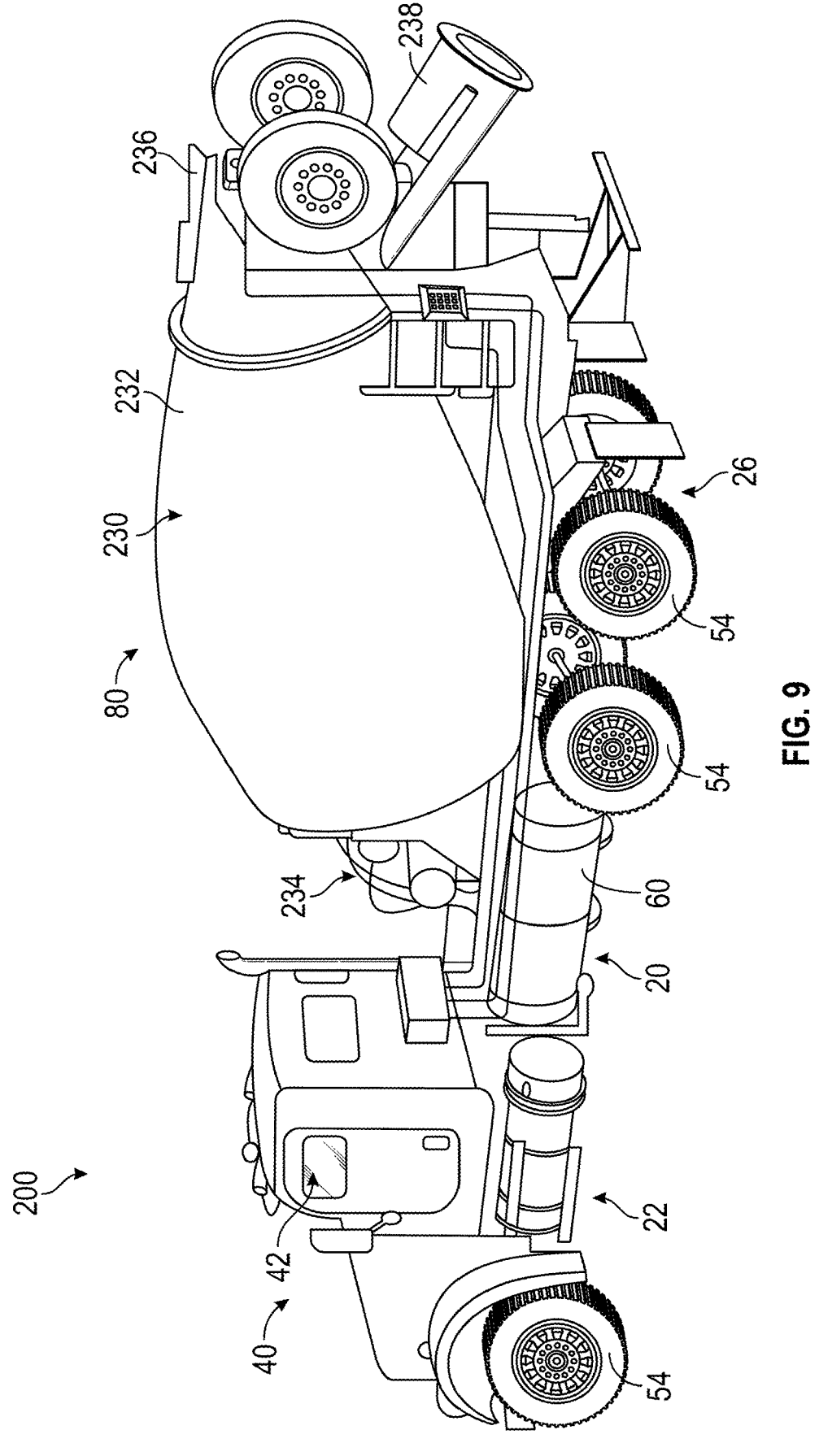
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
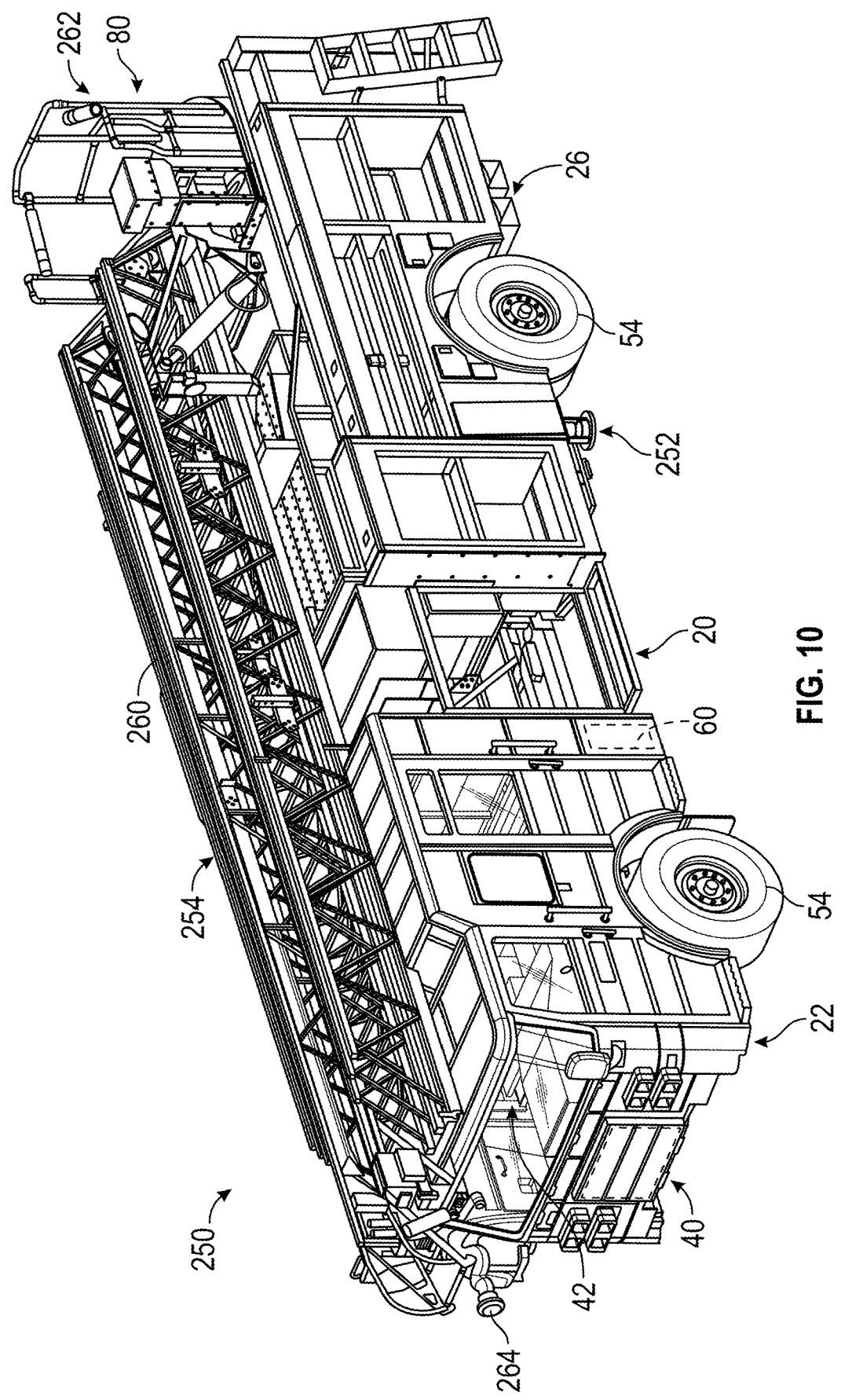
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
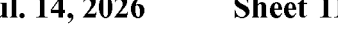
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
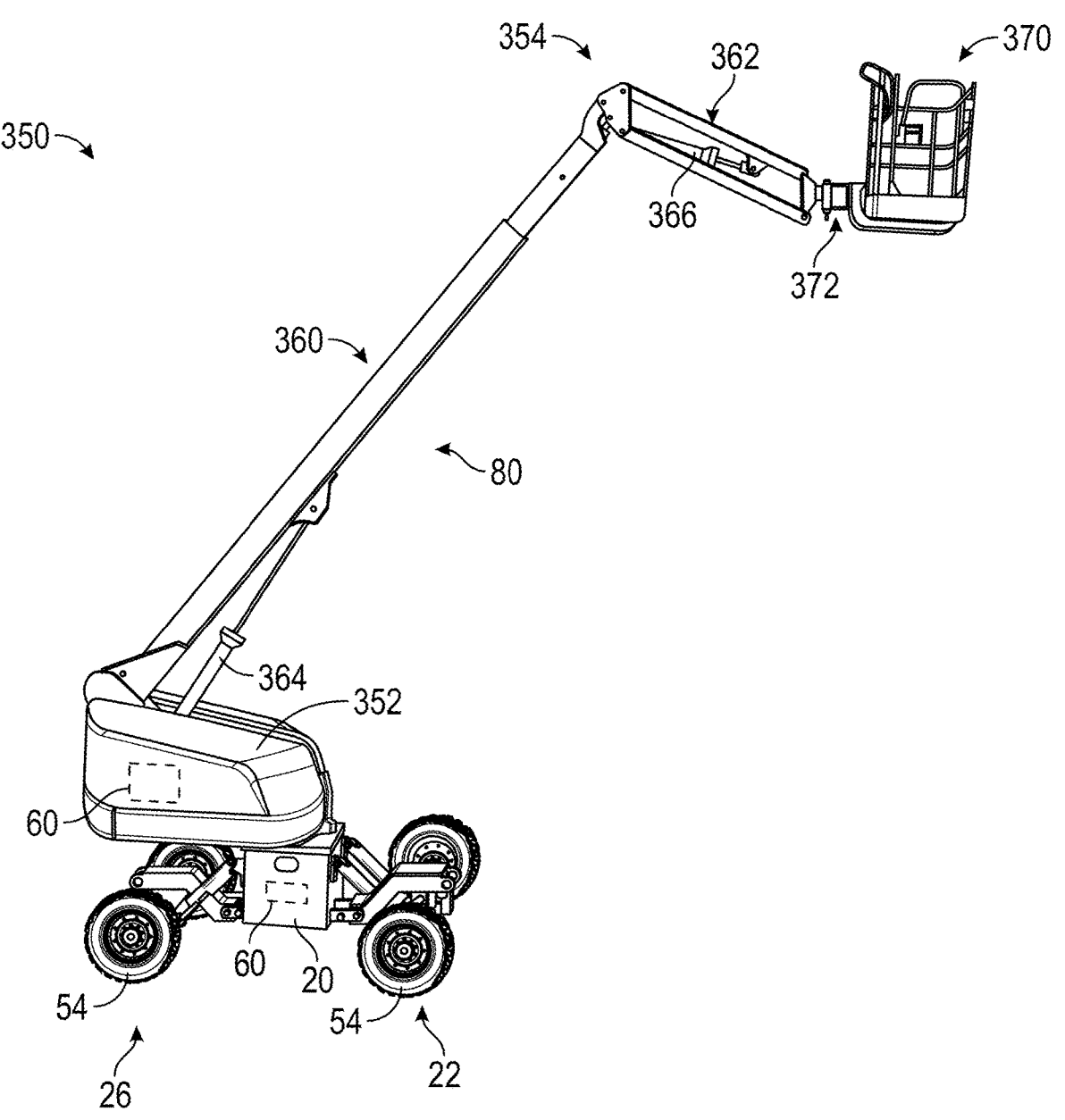
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may include structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
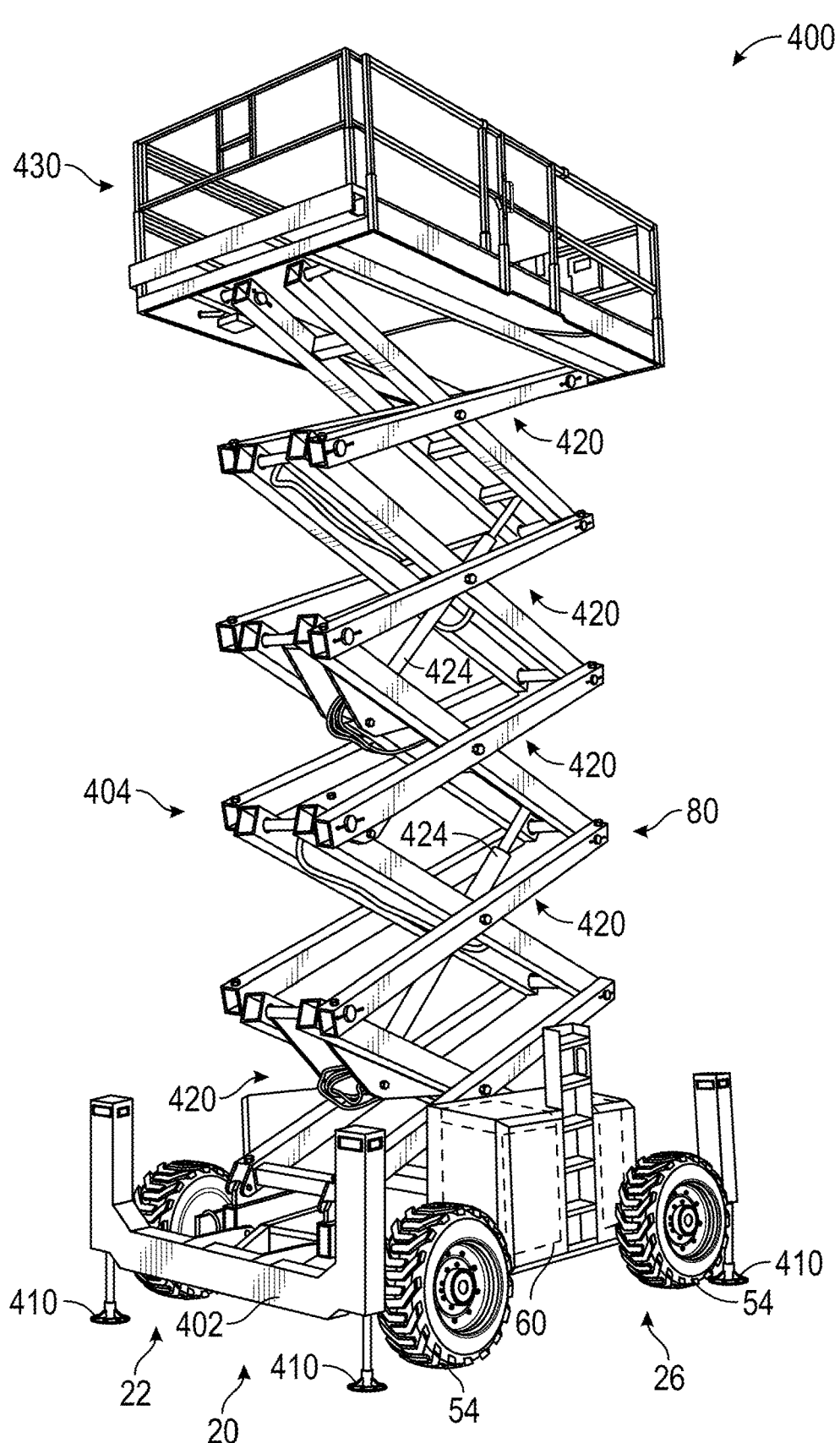
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Refuse Vehicle with a Hopper Fill Sensor

In general, the refuse vehicles 100 illustrated in FIGS. 3-8 can be equipped with a hopper sensor that is configured to measure a refuse height in the hopper volume. The measured refuse height provides an indication of when to initiate a packing procedure. During the packing procedure, a pack panel extends from a retracted position to compact the refuse in the hopper toward the storage volume. After the packing procedure, the hopper sensor continues to monitor the refuse height to actively control the initiation of the packing procedure.

Figure 14:
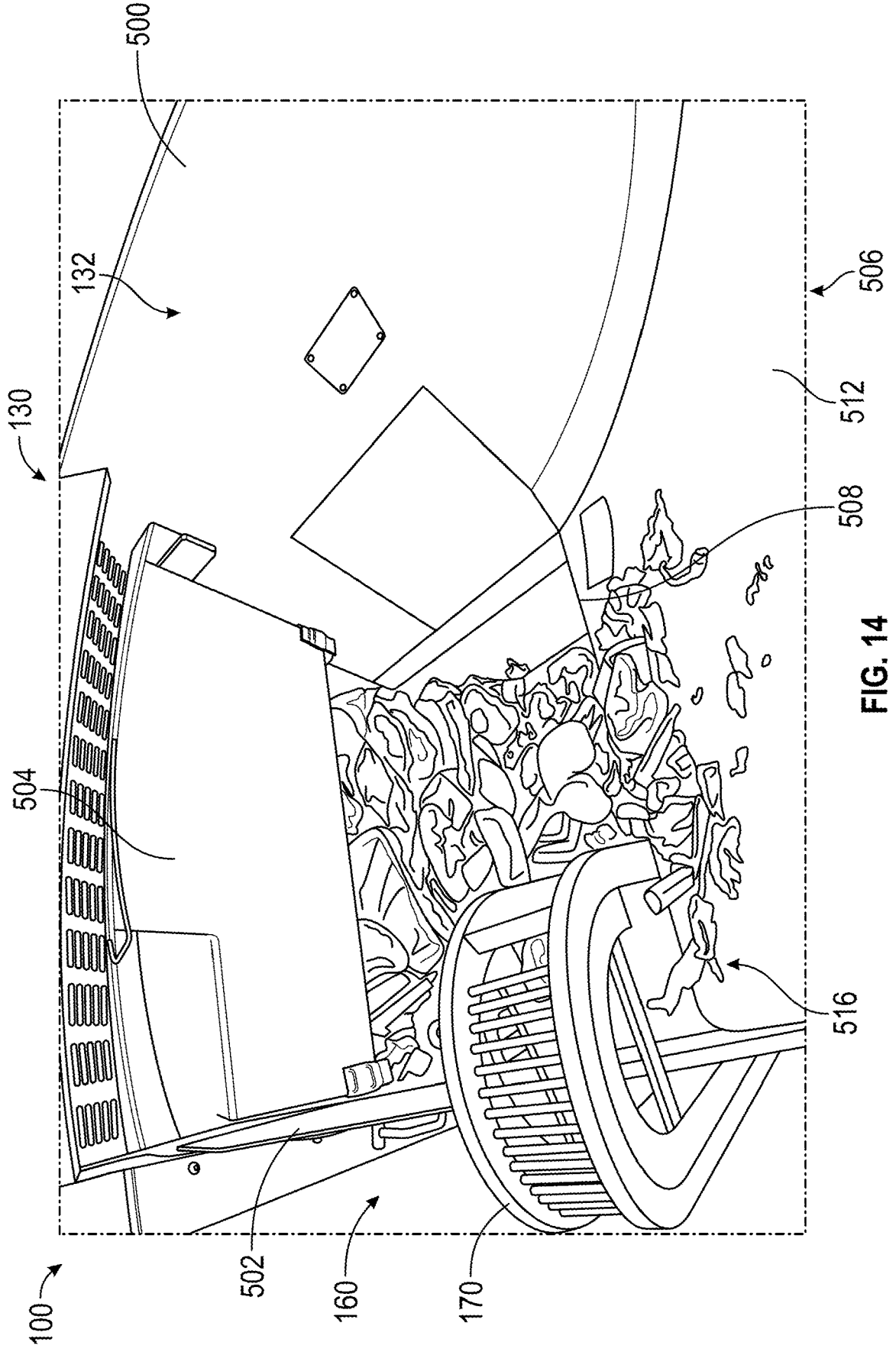
FIG. 14 is a perspective view of a refuse compartment and hopper volume of the side-loading refuse vehicle of FIG. 5, according to an exemplary embodiment.
Figure 15:
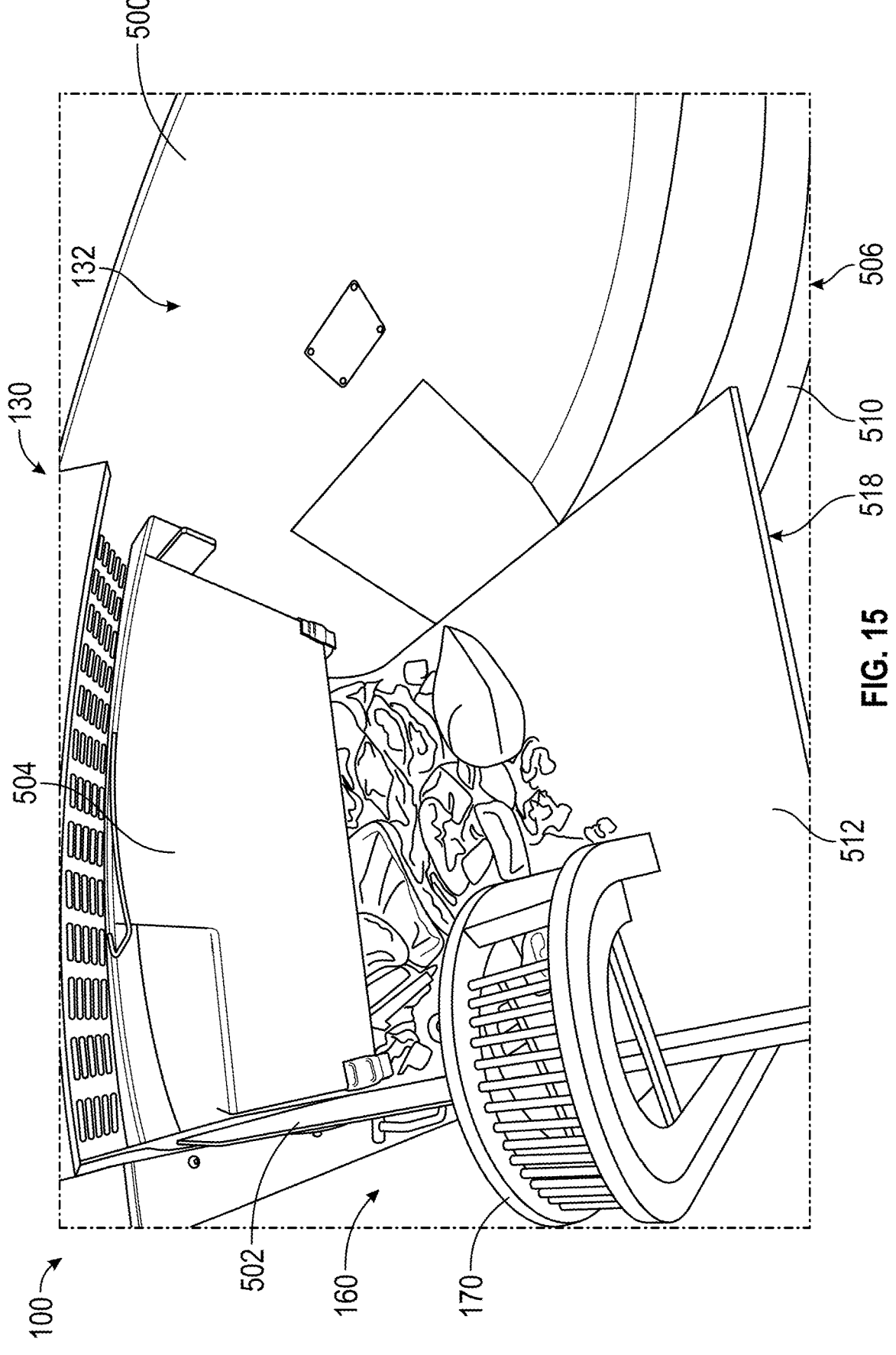
FIG. 15 is a perspective view of the refuse compartment and the hopper volume of FIG. 14 with a pack panel at least partially extended, according to an exemplary embodiment.
Figure 16:
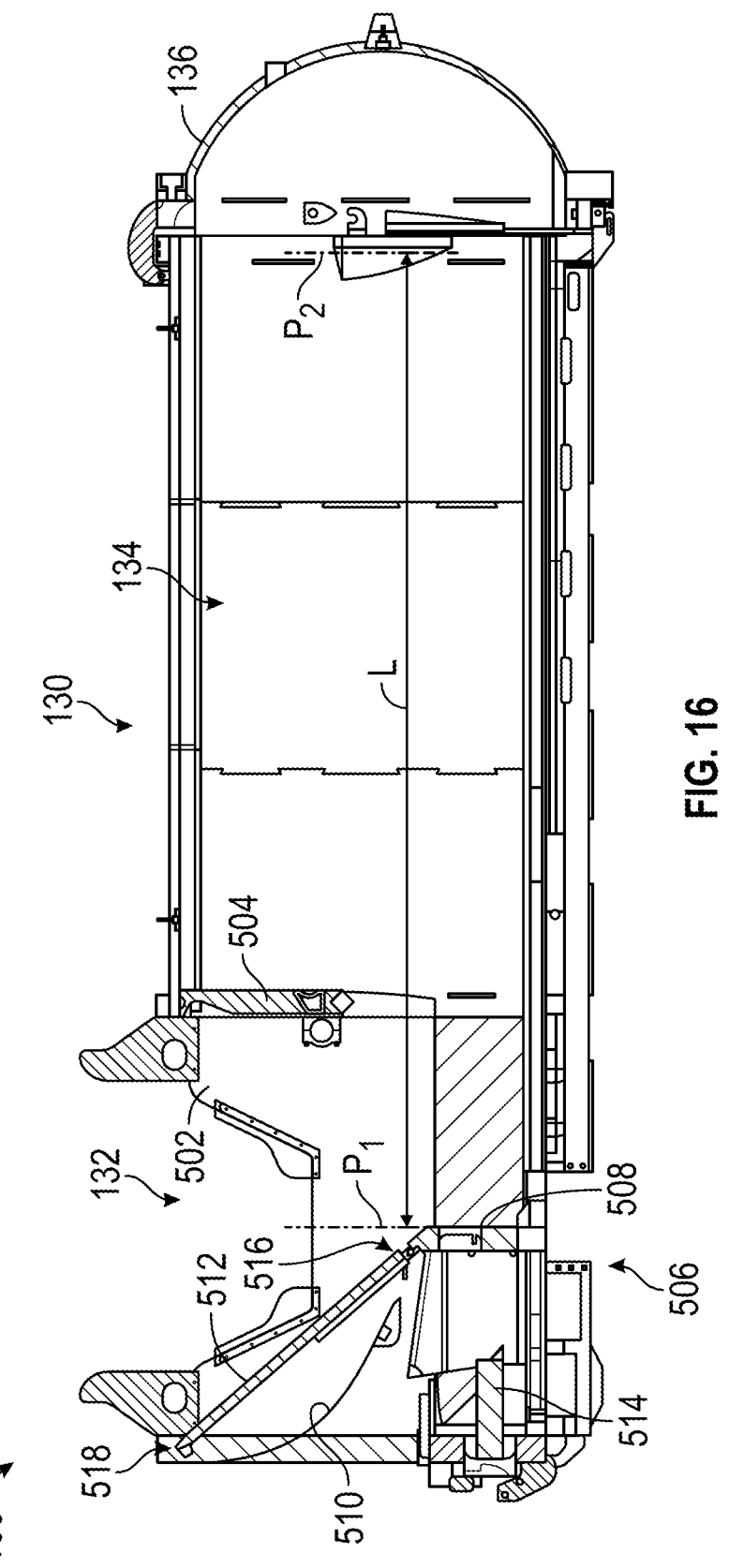
FIG. 16 is a cross-sectional view of a refuse compartment and a packing assembly of the side-loading vehicle of FIG. 5, with a pack panel in a retracted position, according to an exemplary embodiment.

FIGS. 14 and 15 illustrate an exemplary embodiment of the refuse compartment 130 of the side-loading refuse vehicle 100. As shown in FIGS. 14 and 15, the hopper volume 132 is an internal volume of the refuse compartment 130 and is defined by a left sidewall 500, a right sidewall 502, a holding plate 504, and a packing assembly 506. The left sidewall 500 extends longitudinally (e.g., in a direction extending between the cab 40 and the tailgate 136) between the holding plate 504 and the packing assembly 506. The lifting assembly 160 is arranged on the right sidewall 502, and the holding plate 504 extends downwardly (e.g., in a direction toward the chassis 20, or in a direction perpendicular to the ground on which the vehicle 100 travels) from a top wall of the refuse compartment 130. In general, the holding plate 504 separates the hopper volume 132 and the storage volume 134 and forms a partition between the two sections in the refuse compartment 130. In addition, the holding plate 504 aids in preventing refuse being packed into the storage volume 134 from falling back toward the hopper volume 132.

With reference to FIGS. 14-18, the packing assembly 506 includes a pack panel 508, a ramped or curved wall 510, a pivot plate 512, and a packing actuator 514. The pack panel 508 extends generally vertically (e.g., in a direction perpendicular to a road on which the vehicle 100 travels) and faces in a direction toward the storage volume 134 (e.g., a normal extending from the outer surface of the pack panel 508 is directed toward the storage volume 134). A first end 516 of the pivot plate 512 is rotatably coupled to a distal end of the pack panel 508 so that the pivot plate 512 rotates relative to the pack panel 508 as the pack panel 508 moves between retracted and extended positions. A second end 518 of the pivot plate 512 is configured to engage and slide along the curved wall 510 (e.g., when the pack panel 508 is in a position where the second end 518 of the pivot plate 512 overlaps with the curved wall 510). The curved wall 510 defines a generally curved profile that ramps downwardly in a direction toward the storage volume 134.

The pack panel 508 is coupled to the packing actuator 514 so that the packing actuator 514 selectively moves the pack panel 508 between a retracted or home position (see, e.g., FIGS. 14 and 16) and an extended or eject position (see, e.g., FIG. 18), between the extended position and the retracted position, and any position in between the extended position and the retracted position. In some embodiments, the packing actuator 514 is a telescoping actuator that is pneumatically, hydraulically, electronically, or electro-hydraulically driven.

Figure 17:
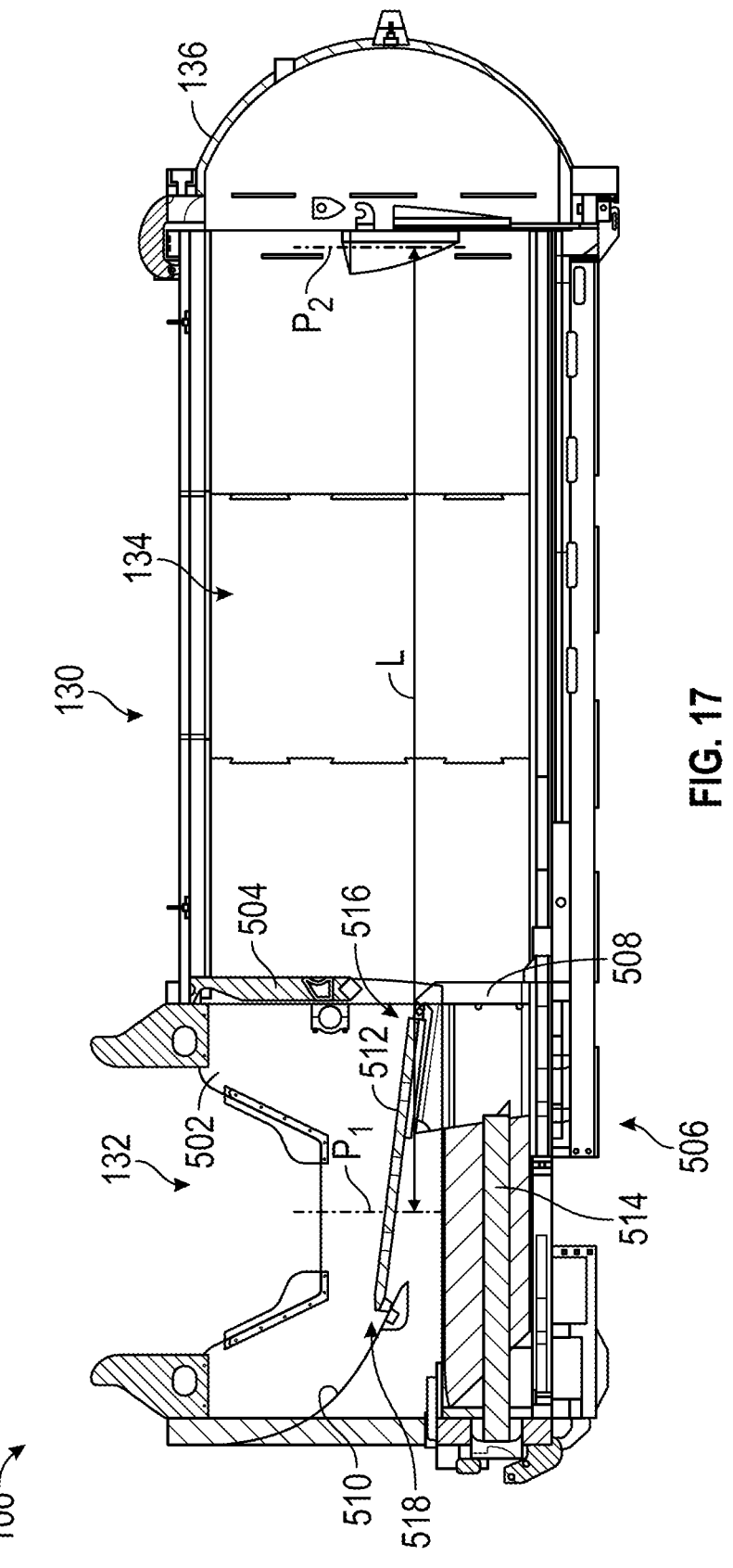
FIG. 17 is a cross-sectional view of a refuse compartment and a packing assembly of the side-loading vehicle of FIG. 5, with a pack panel extended between a retracted position and an extended position, according to an exemplary embodiment.

A packing procedure generally includes moving the pack panel 508 from the retracted position (see, e.g., FIGS. 14 and 16) to a position where the pack panel 508 is at least partially extended from the retracted position in a direction toward the extended position (see, e.g., FIGS. 15 and 17). In the retracted position, the pack panel 508 is arranged at least partially within the hopper volume 132, and the packing procedure extends the pack panel 508 toward the storage volume 134 to compact and displace refuse in the hopper volume 132 in a direction toward the storage volume 134. This enables the hopper volume 132 to be repeatedly filled and packed until the storage volume 134 is full and an ejection procedure is required.

Figure 18:
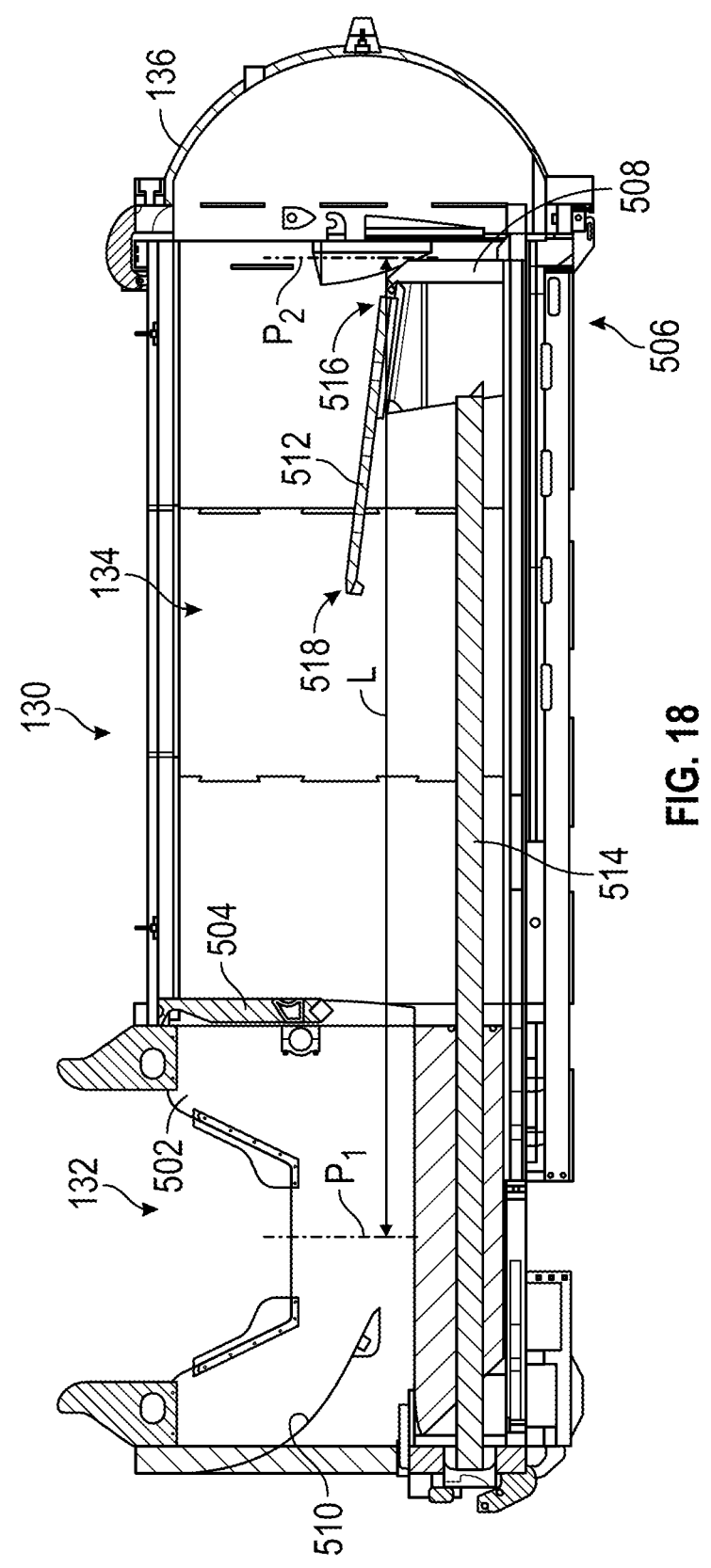
FIG. 18 is a cross-sectional view of a refuse compartment and a packing assembly of the side-loading vehicle of FIG. 5, with a pack panel in an extended position, according to an exemplary embodiment.

The ejection procedure generally includes moving the pack panel 508, via the packing actuator 514, to the extended or eject position (see, e.g., FIG. 18). During the ejection procedure, the tailgate 136 is opened and the pack panel 508 is moved to the extended position and refuse in the storage volume 134 is ejected. The movement of the pack panel 508 between the retracted position and the extended position defines a travel length or distance of the pack panel 508. For example, in the retracted position, the pack panel 508 defines an initial plane $P_1$ and, in the extended position, the pack panel 508 defines a final plane $P_2$. A length L is defined between the initial plane $P_1$ and the final plane $P_2$ and represents the travel distance traversed by the pack panel 508 between the retracted and extended positions.

Figure 19:
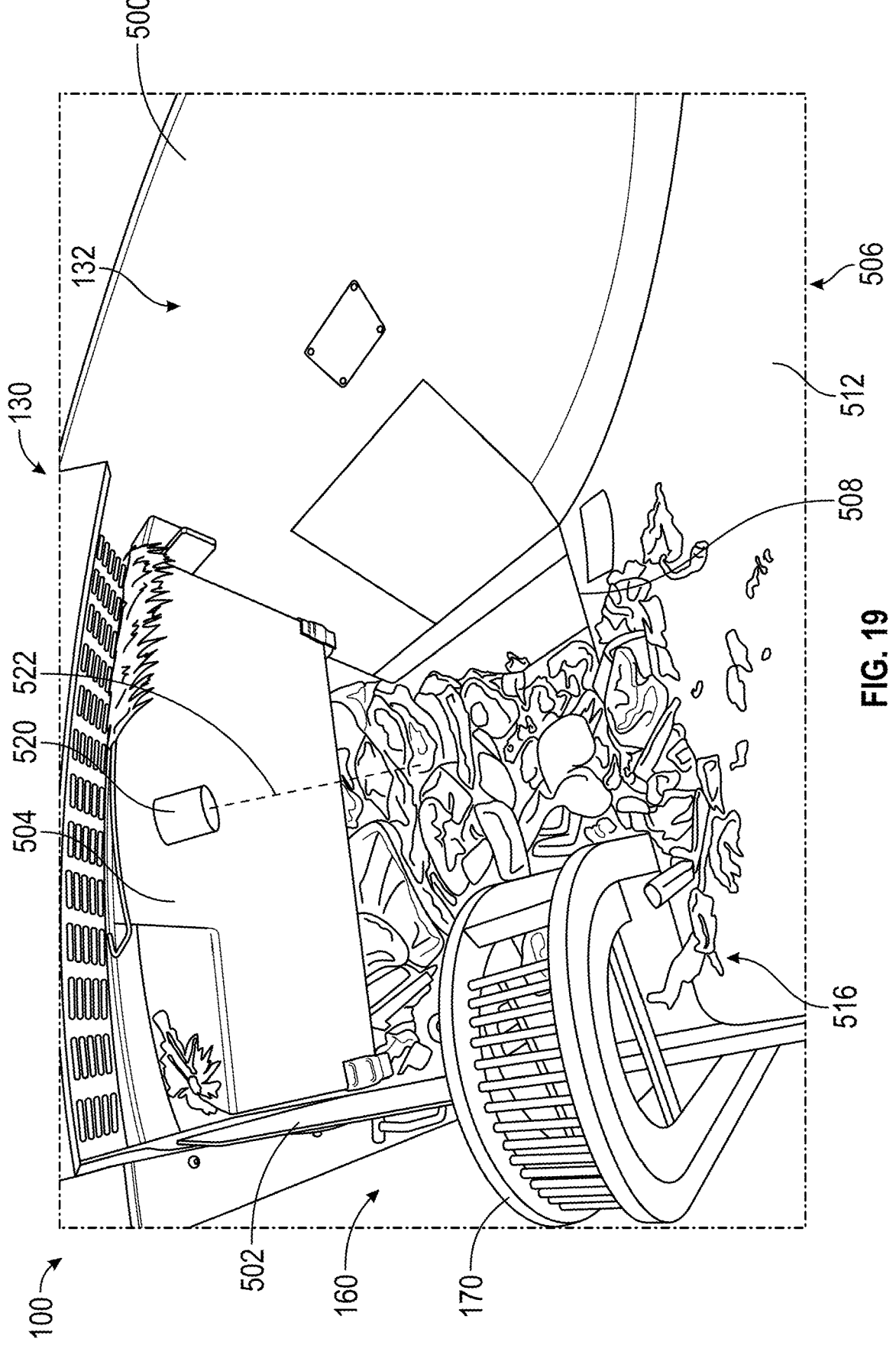
FIG. 19 is a perspective view of the refuse compartment and the hopper volume of FIG. 14 including a hopper sensor coupled to a holding plate, according to an exemplary embodiment.
Figure 20:
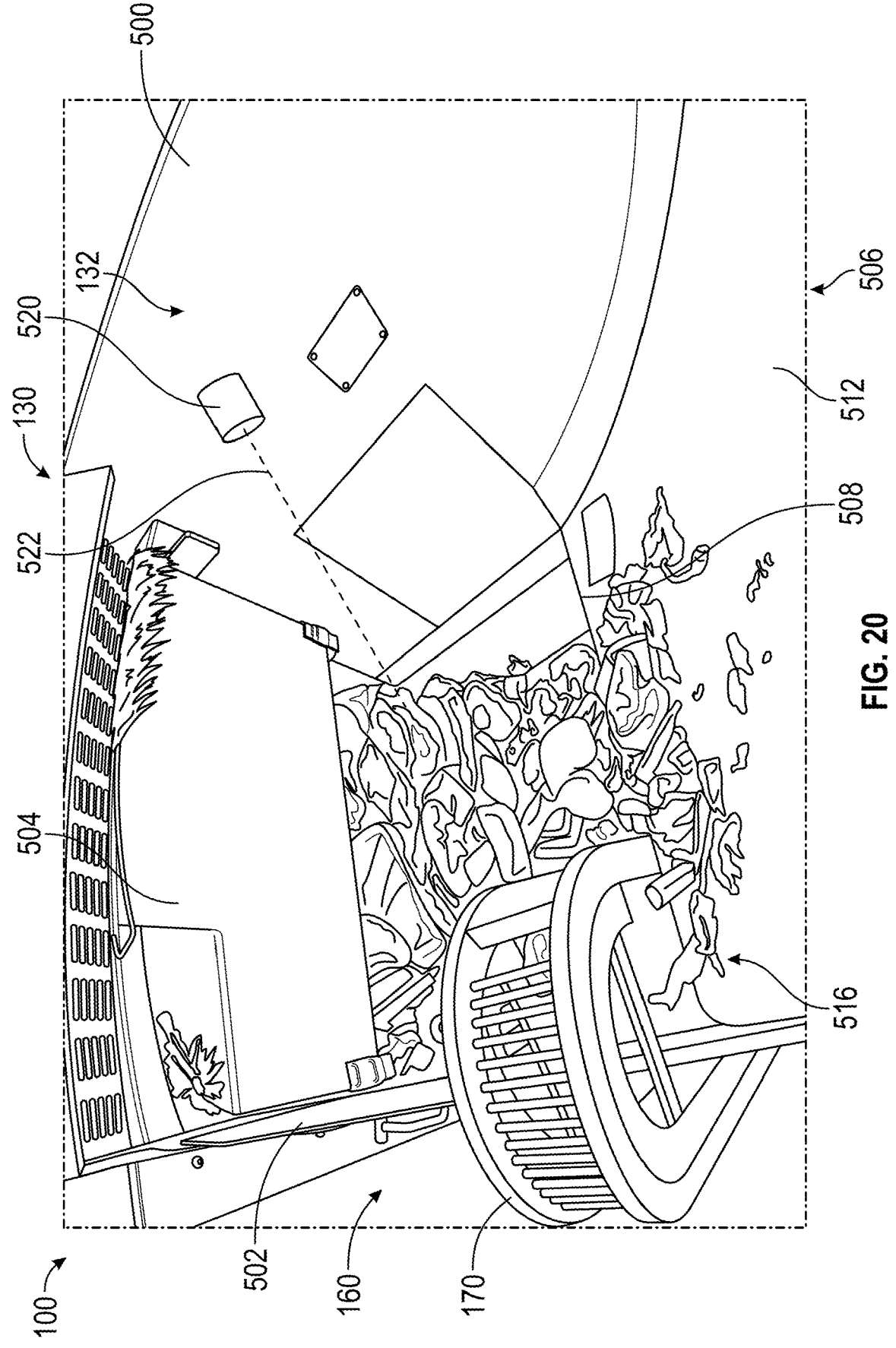
FIG. 20 is a perspective view of the refuse compartment and the hopper volume of FIG. 14 including a hopper sensor coupled to a sidewall, according to an exemplary embodiment.

As shown in FIGS. 19 and 20, the vehicle 100 includes a hopper sensor 520 coupled to an portion of the refuse compartment 130. The hopper sensor 520 is arranged so that a field of view 522 is directed toward the hopper volume 132, which enables the hopper sensor 520 to measure a refuse height within the hopper volume 132. In some embodiments, the hopper sensor 520 is in the form of a LIDAR sensor, a time-of-flight camera, or an equivalent sensor capable of measuring and monitoring the refuse height within the hopper volume 132. In some embodiments, the hopper sensor 520 is coupled to the holding plate 504, as shown in FIG. 19. In some embodiments, the hopper sensor 520 is coupled to the left sidewall 500, as shown in FIG. 20. In some embodiments, the hopper sensor 520 is coupled to any internal surface or sidewall of the refuse compartment 130 so that the hopper sensor 520 is arranged to direct the field of view 522 toward the hopper volume 132 and the refuse therein.

Figure 21:
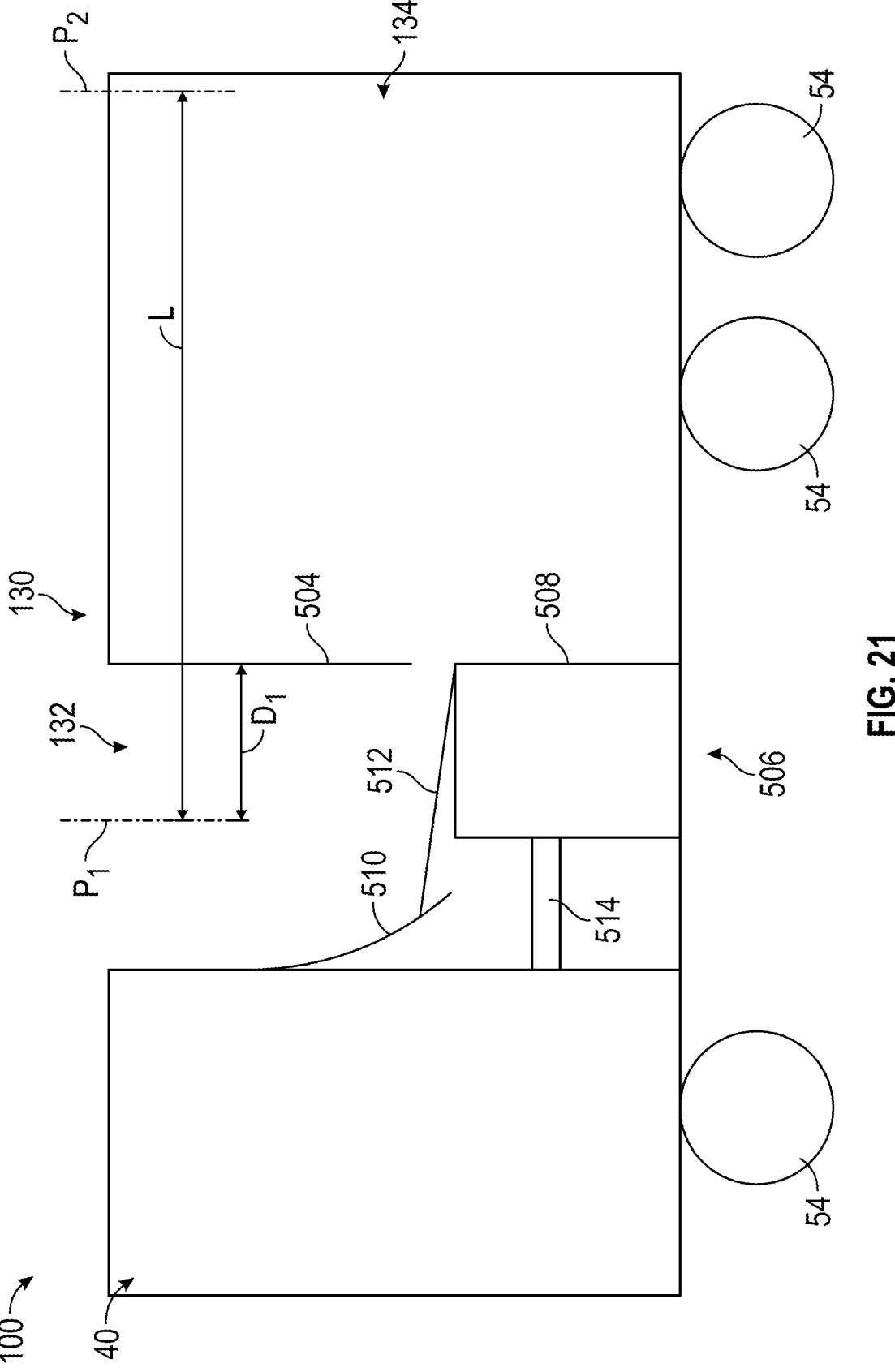
FIG. 21 is a schematic illustration of the side-loading refuse vehicle of FIG. 5 with a pack panel in a first position between a retracted position and an extended position, according to an exemplary embodiment.
Figure 22:
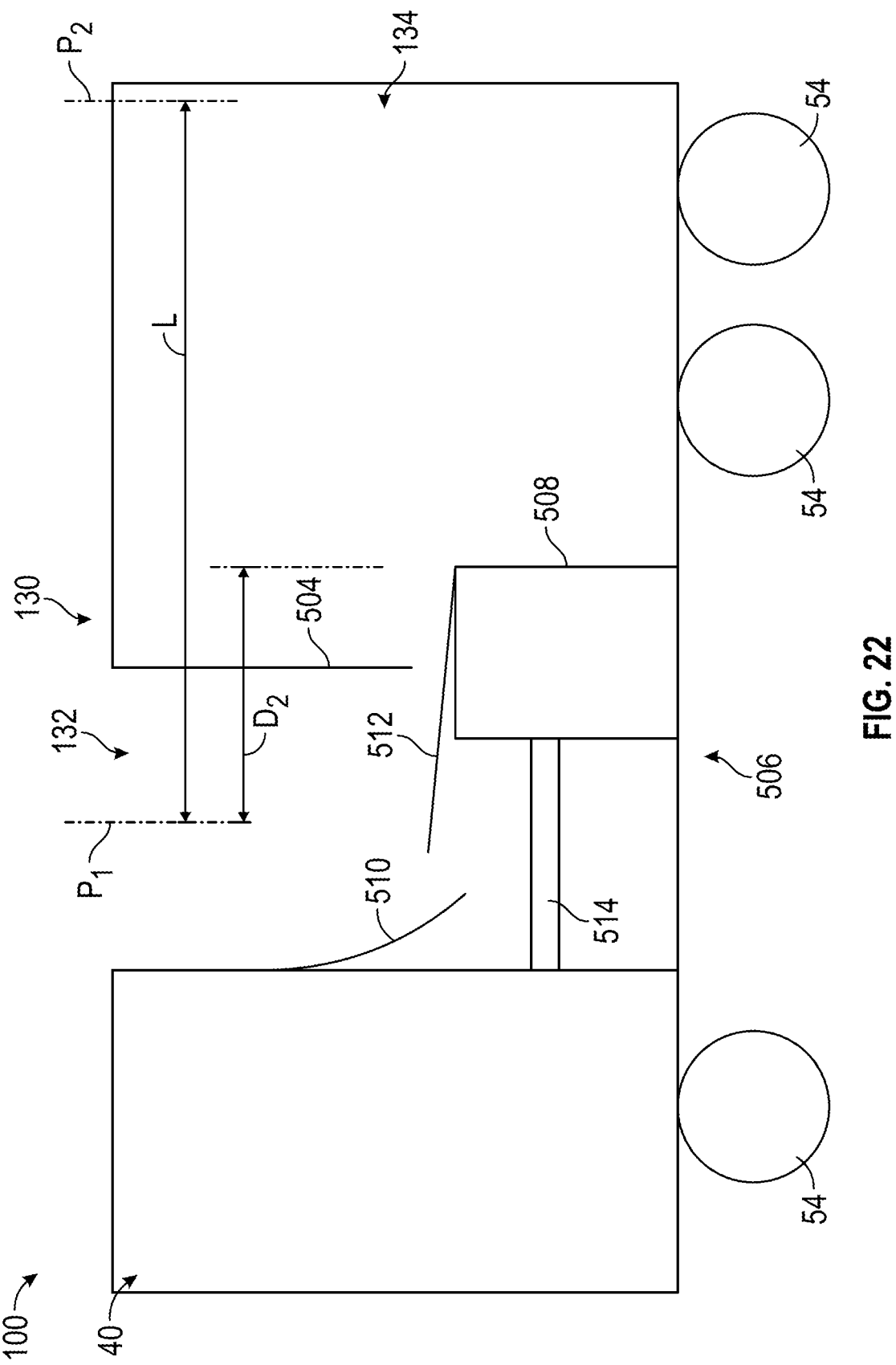
FIG. 22 is a schematic illustration of the side-loading refuse vehicle of FIG. 5 with a pack panel in a second position between a retracted position and an extended position, according to an exemplary embodiment.
Figure 23:
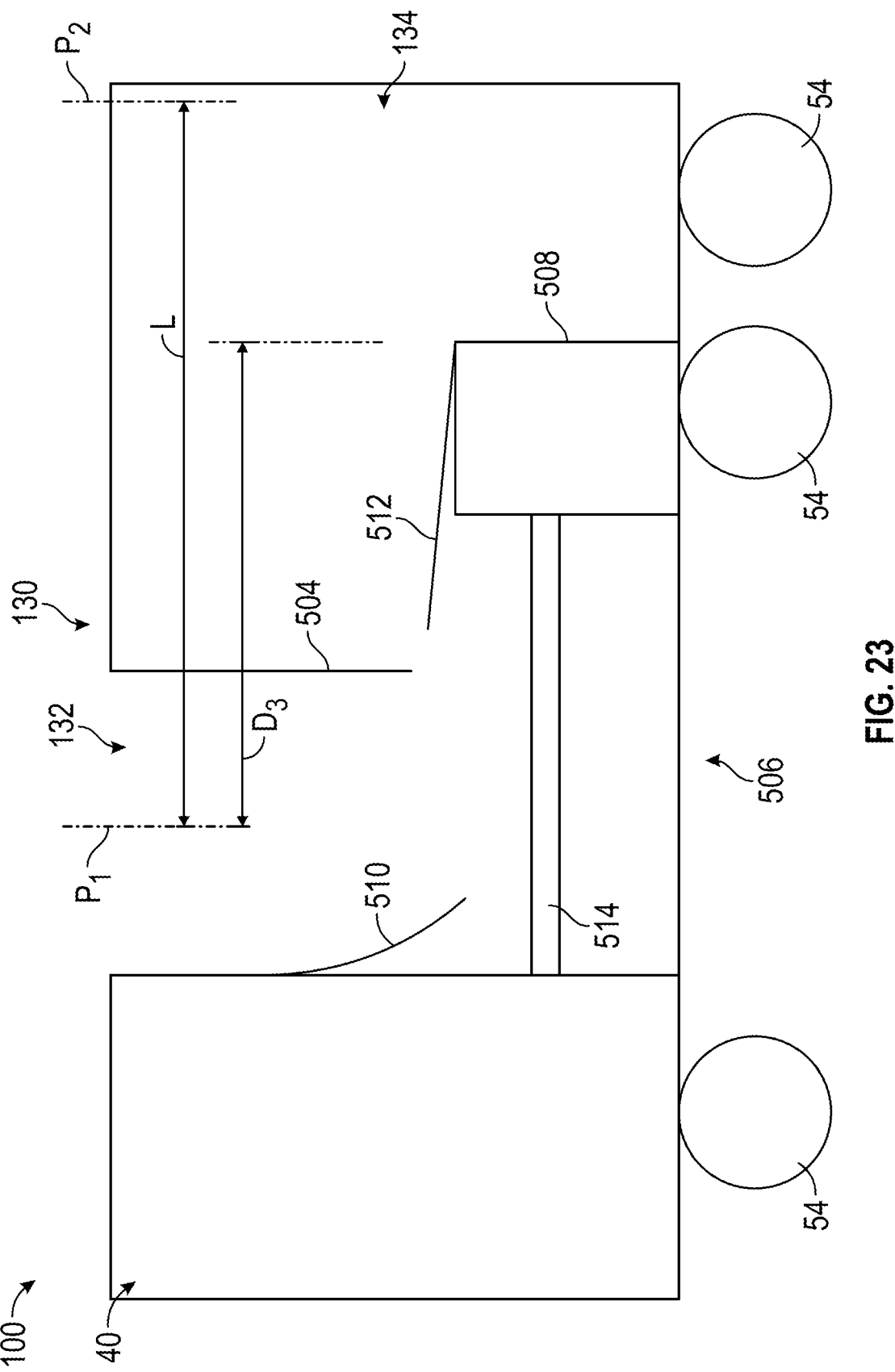
FIG. 23 is a schematic illustration of the side-loading refuse vehicle of FIG. 5 with a pack panel in a third position between a retracted position and an extended position, according to an exemplary embodiment.

As described herein, the packing procedure generally includes moving the pack panel 508 from the retracted position to a position where the pack panel 508 is at least partially extended from the retracted position in a direction toward the extended position. The packing actuator 514 is configured to move the pack panel 508 to any position along the length L between the retracted position and the extended position. For example, turning to FIGS. 21-23, the packing actuator 514 is configured to move the pack panel 508 to a first position (FIG. 21), a second position (FIG. 22), or a third position (FIG. 23) along the length L. The second position is between the first position and the third position, and the first position is closer to the retracted position than the third position. In the first position, the pack panel 508 moves a first distance $D_1$ from the retracted position. The first distance $D_1$ is defined between the initial plane $P_1$ and the position of the pack panel 508 in the first position. In the second position the pack panel 508 moves a second distance $D_2$ from the retracted position. The second distance $D_2$ is defined between the initial plane $P_1$ and the position of the pack panel 508 in the second position. In the third position, the pack panel 508 moves a third distance $D_3$ from the retracted position. The third distance $D_3$ is defined between the initial plane $P_1$ and the position of the pack panel 508 in the third position. The first distance $D_1$ is less than the second distance $D_2$, and the second distance $D_2$ is less than the third distance $D_3$. In some embodiments, the first distance $D_1$ is between about 0% and about 35% of the length L, the second distance $D_2$ is between about 35% and 65% of the length L, and the third distance $D_3$ is between about 65% and about 100% of the length L.

During the packing procedure, the packing actuator 514 can extend the pack panel 508 to any one of the first position, the second position, the third position, or any other position between the retracted position and the extended position. In some embodiments, the packing actuator 514 extends the pack panel 508 to generally align with the holding plate 504 during the packing procedure (see, e.g., FIGS. 17 and 21). For example, a distance between the pack panel 508 and the initial plane P1 can be within about 2%, 5%, or 10% of a distance between the initial plane P1 and the holding plate 504 (e.g., a rear surface of the holding plate 504 that faces the storage volume 134). After the pack panel 508 extends away from the retracted position, the pack panel 508 returns to the retracted position to complete the packing procedure.

Figure 24:
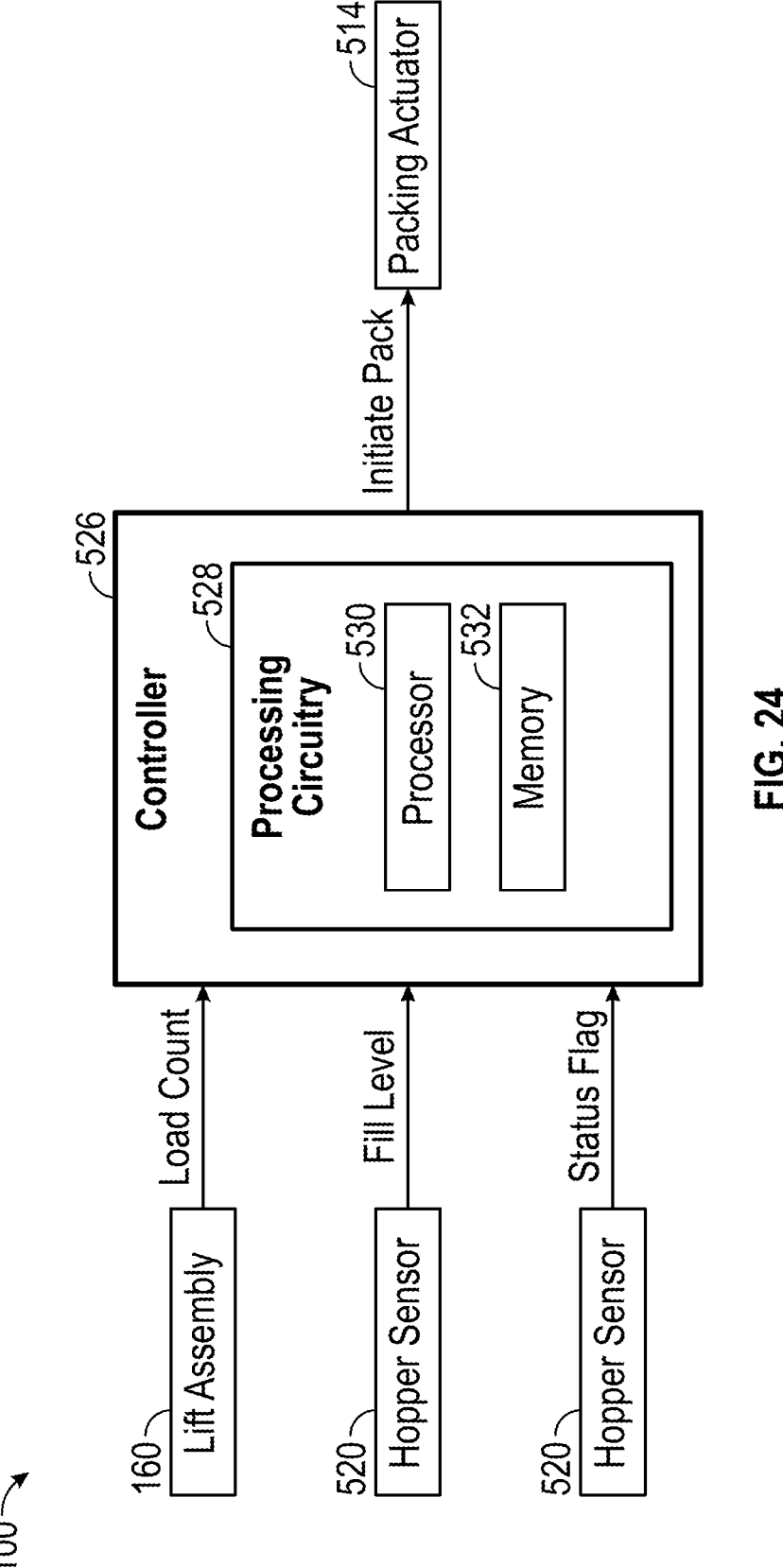
FIG. 24 is a block diagram of a controller of the side-loading refuse vehicle of FIG. 5, according to an exemplary embodiment.

As shown in FIG. 24, the vehicle 100 includes a controller 526 in communication with the hopper sensor 520, the lift assembly 160, and the packing actuator 514. In some embodiments, the controller 526 is a native controller on the vehicle 100 that communicates over a vehicle CAN bus. In some embodiments, the controller 526 is a dedicated controller that is included on the vehicle to control operations of the packing assembly 506 and the hopper sensor 520. The controller 526 includes a processing circuit 528 having a processor 530 and memory 532. The processing circuit 528 can be communicatively connected to a communications interface such that the processing circuit 528 and the various components thereof can send and receive data via the communications interface. The processor 530 can be implemented as a general purpose processor, an application specific integrated circuit ("ASIC"), one or more field programmable gate arrays ("FPGAs"), a group of processing components, or other suitable electronic processing components.

The memory 532 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 532 can be or include volatile memory or non-volatile memory. The memory 532 can include database components, object code components, script components, or any other type of information structure for supporting the various activities and information structures described in the present application. According to some embodiments, the memory 532 is communicably connected to the processor 530 via the processing circuit 528 and includes computer code for executing (e.g., by the processing circuit 528 and/or the processor 530) one or more processes described herein.

The refuse height measured by the hopper sensor 520 is communicated to the controller 526, and the controller 526 is configured to monitor the refuse height and determine if the refuse height is greater than or equal to a refuse height threshold. If the refuse height is greater than or equal to the refuse height threshold, the controller 526 instructs the packing actuator 514 to initiate the packing procedure where the pack panel 508 extends away from the retracted position to pack refuse in the hopper volume 132. In some embodiments, the controller 526 is configured to monitor a status of hopper sensor 520 to determine if the hopper sensor 520 is operational and/or unblocked. For example, a status flag for the hopper sensor 520 can be monitored by the controller 526, and the status flag can provide an indication of whether the hopper sensor 520 is active or inactive. In some embodiments, the status flag is generally related to an operational status of the hopper sensor 520. In some embodiments, the status flag is related to whether or not the hopper sensor 520 is blocked. For example, if the hopper sensor 520 measures a refuse height is less than a blocked threshold value (e.g., less than about 2 ft, less than about 1 ft, or less than about 6 in), the status flag updates to an inactive status to indicate that the hopper sensor is blocked by refuse. In some embodiments, the controller 526 is configured to monitor the lift assembly 160 and count a number of times that the lift assembly 160 lifts a refuse container and dumps refuse into the hopper volume 132.

Figure 25:
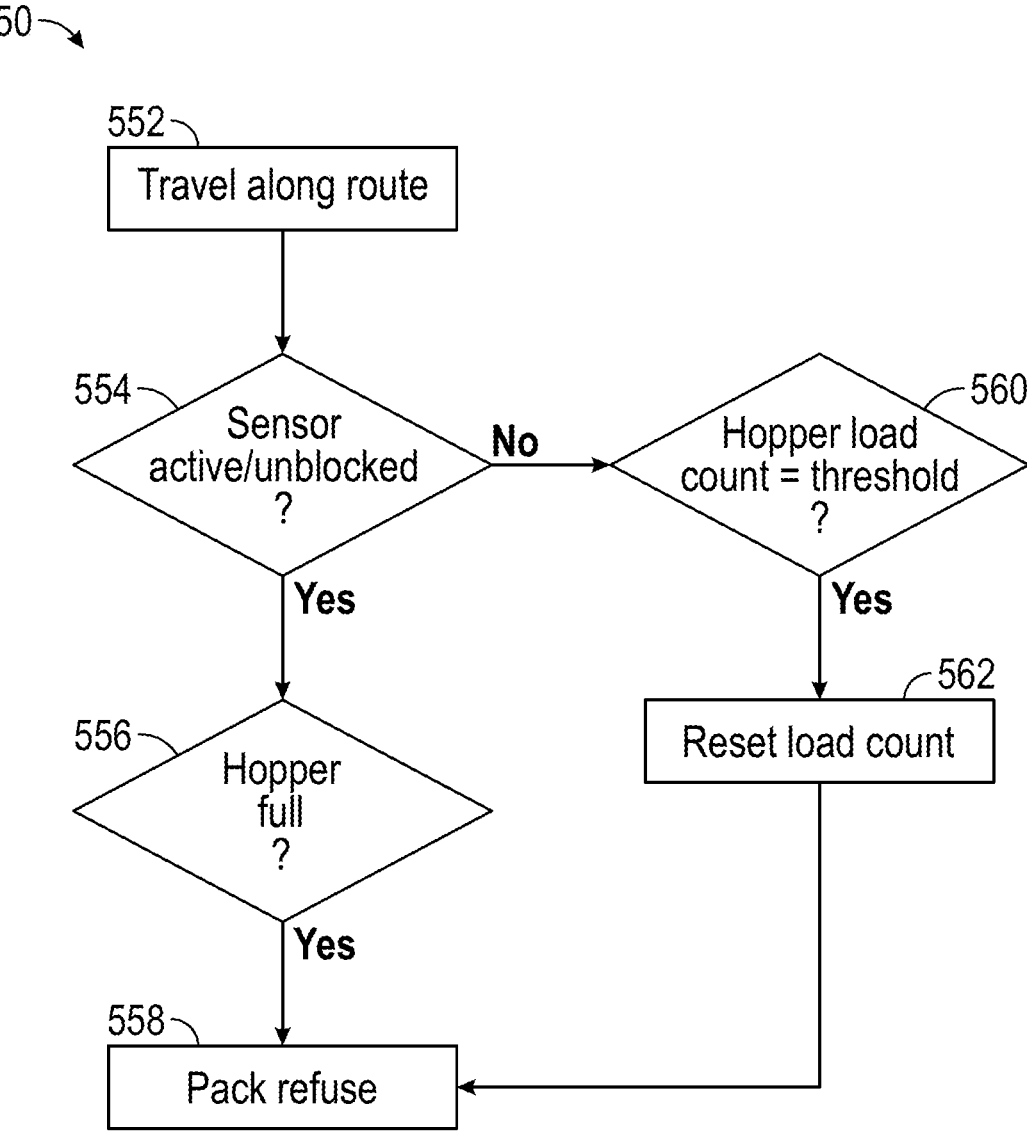
FIG. 25 is a flow chart illustrating a method of operating a refuse vehicle, according to an exemplary embodiment.

FIG. 25 shows the steps of a method 550 for operating a refuse vehicle (e.g., the refuse vehicle 100) having a hopper sensor (e.g., the hopper sensor 520). Initially, at step 552, the vehicle 100 travels along a predetermined travel route making stops to pick up and empty refuse containers into the hopper volume 132 using the lift assembly 160. As the vehicle 100 to travels and empties refuse containers, the status flag of the hopper sensor 520 is monitored by the controller 526. At step 554, if the controller 526 determines that the stats flag indicates that the hopper sensor 520 is active and/or unblocked, the controller 526 monitors refuse height measured by the hopper sensor 520 and determines if the refuse height is greater than or equal to a refuse height threshold at step 556. In response to determining that the refuse height is greater than or equal to the refuse height threshold at step 556, the controller 526 is configured to instruct the packing actuator 514 to extend away from the retracted position and perform the packing procedure at step 558. In general, the packing procedure packs the refuse in the hopper volume 132 into the storage volume 134, which reduces the refuse height in the hopper volume 132. The controller 526 continuously monitors the refuse height via the hopper sensor 520 as the vehicle 100 travels along the predefined travel route and initiates packing procedures along the travel route when the hopper sensor 520 senses that the refuse height is greater than or equal to the refuse height threshold.

If the controller 526 determines at step 554 that the status flag indicates that the hopper sensor 520 is inactive and/or blocked, the packing procedure is initiated based on the number of times a refuse container is loaded into the hopper volume 132. For example, at step 560, the controller 526 determines if a hopper load count (e.g., a number of times that a refuse container has been emptied into the hopper volume 132 by the lift assembly 160 since the last packing procedure) is greater than or equal to a threshold load count. In response to determining that the hopper load count is greater than or equal to the threshold load count at step 560, the controller 526 is configured to reset the hopper load count to zero at step 562 and subsequently instruct the packing actuator 514 to extend away from the retracted position and perform the packing procedure at step 558. In some embodiments, the threshold load count is about nine, or about ten.

In general, the incorporation of the hopper sensor 520 into the vehicle 100 enables the packing assembly 506 to actively pack the refuse in the hopper volume 132 based on the height of the refuse within the hopper volume 132. In this way, for example, the vehicle 100 can inhibit or prevent refuse from falling out of the hopper volume 132 as the vehicle 100 travels because the refuse is packed in accordance with the refuse height. It should be appreciated that although the properties and functionality of the packing assembly 506 and the hopper sensor 520 are described with reference to the side-loading configuration of the vehicle 100, the hopper sensor 520 is also capable of being incorporated into the front-loading configuration of the vehicle 100 to control the packing procedure in the same manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
   a chassis;
   a cab coupled to the chassis;
   a refuse compartment supported by the chassis and including a storage volume and a hopper volume, the hopper volume being arranged between the cab and the storage volume;
   a lift assembly configured to selectively move relative to the refuse compartment;
   a hopper sensor coupled to a portion of the refuse compartment and configured to measure a refuse height within the hopper volume;
   a packing assembly including a pack panel and a packing actuator, wherein the packing actuator is configured to selectively move the pack panel between a retracted position and an extended position, and wherein the pack panel is configured to extend away from the retracted position in response to the hopper sensor sensing that the refuse height is greater than or equal to a refuse height threshold; and
   a controller having a processor and at least one memory, the controller being in communication with the hopper sensor and the packing actuator and being configured to:

monitor the refuse height sensed by the hopper sensor;
   determine if the refuse height is greater than or equal to the refuse height threshold;
   in response to determining that the refuse height is greater than or equal to the refuse height threshold, instruct the packing actuator to extend away from the retracted position;
   monitor a status flag for the hopper sensor; and
   in response to determining that the status flag for the hopper sensor is inactive, instruct the packing actuator to extend away from the retracted position based on a hopper load count being greater than or equal to a threshold load count.

2. The refuse vehicle of claim 1, wherein the hopper sensor is coupled to a holding plate that separates the hopper volume and the storage volume.

3. The refuse vehicle of claim 1, wherein the hopper sensor is coupled to an internal sidewall of the refuse compartment.

4. The refuse vehicle of claim 1, wherein the hopper load count is based on a number of times that the lift assembly has been lifted since the packing actuator last extended away from the retracted position.

5. The refuse vehicle of claim 1, wherein the controller is configured to detect that the status flag for the hopper sensor is inactive in response to the hopper sensor measuring the refuse height is less than a blocked threshold value.

6. The refuse vehicle of claim 1, wherein the hopper sensor is in the form of a LIDAR sensor or a time-of-flight camera.

7. A refuse vehicle comprising:
   a chassis;
   a cab coupled to the chassis;
   a refuse compartment supported by the chassis and including a storage volume and a hopper volume, the hopper volume being arranged between the cab and the storage volume;
   a lift assembly configured to selectively move relative to the refuse compartment;
   a hopper sensor coupled to a portion of the refuse compartment and configured to measure a refuse height within the hopper volume;
   a packing assembly including a pack panel and a packing actuator, wherein the packing actuator is configured to selectively move the pack panel between a retracted position and an extended position; and
   a controller having a processor and at least one memory, the controller being in communication with the hopper sensor and the packing actuator and being configured to:
      monitor a status flag of the hopper sensor;
      in response to determining that the status flag is active, determine if the refuse height is greater than or equal to a refuse height threshold;
      in response to determining that the refuse height is greater than or equal to the refuse height threshold, instruct the packing actuator to extend away from the retracted position; and
      in response to determining that the status flag for the hopper sensor is inactive, instruct the packing actuator to extend away from the retracted position based on a hopper load count.

8. The refuse vehicle of claim 7, wherein the hopper sensor is coupled to a holding plate that separates the hopper volume and the storage volume.

9. The refuse vehicle of claim 7, wherein the hopper sensor is coupled to an internal sidewall of the refuse compartment.

10. The refuse vehicle of claim 7, wherein the hopper sensor is in the form of a LIDAR sensor or a time-of-flight camera.

11. The refuse vehicle of claim 7, wherein the controller is further configured to instruct the packing actuator to extend away from the retracted position based on the hopper load count being greater than or equal to a threshold load count.

12. The refuse vehicle of claim 7, wherein the hopper load count is based on a number of times that the lift assembly has been lifted since the packing actuator last extended away from the retracted position.

13. The refuse vehicle of claim 7, wherein the controller is configured to detect that the status flag for the hopper sensor is inactive in response to the hopper sensor measuring the refuse height is less than a blocked threshold value.

14. A method of operating a refuse vehicle, the method comprising:

monitoring a refuse height within a hopper volume using a hopper sensor;

22 determining a status flag for the hopper sensor;

in response to determining that the status flag for the hopper sensor is active, instructing a packing actuator to perform a packing procedure when the hopper sensor senses that the refuse height is greater than or equal to a refuse height threshold; and in response to determining that the status flag for the hopper sensor is inactive, instructing the packing actuator to perform the packing procedure when a hopper load count is greater than or equal to a threshold load count.

15. The method of claim 14, wherein the hopper load count is based on a number of times that a lift assembly has been lifted since the packing actuator last performed the packing procedure.

16. The method of claim 14, wherein determining that the status flag for the hopper sensor is inactive comprises:

measuring, via the hopper sensor, that the refuse height is less than a blocked threshold value.

17. The method of claim 14, wherein the hopper sensor is in the form of a LIDAR sensor or a time-of-flight camera.

\* \* \* \* \*